(12) United States Patent
Kondo et al.

(10) Patent No.: US 7,875,220 B2
(45) Date of Patent: Jan. 25, 2011

(54) METHOD FOR PRODUCING FIBER-REINFORCED COMPOSITE MEMBER WITH CONNECTING HOLES, AND STRUCTURAL MEMBER FOR AIRCRAFTS CONSTITUTED BY SUCH COMPOSITE MEMBERS

(75) Inventors: Junichi Kondo, Saitama-ken (JP); Yuki Kasahara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 11/984,610

(22) Filed: Nov. 20, 2007

(65) Prior Publication Data

US 2008/0124520 A1      May 29, 2008

(30) Foreign Application Priority Data

Nov. 24, 2006    (JP) .............................. 2006-317673

(51) Int. Cl.
B26F 1/16     (2006.01)
B29C 70/06    (2006.01)
B23B 51/08    (2006.01)

(52) U.S. Cl. .................. 264/156; 264/155; 264/163

(58) Field of Classification Search .............. 264/154, 264/155, 163, 156
See application file for complete search history.

(56) References Cited

U.S. PATENT DOCUMENTS

| | | | | |
|---|---|---|---|---|
| 2,392,804 A | * | 1/1946 | Basolo ........................ | 264/227 |
| 4,451,528 A | * | 5/1984 | Krause ...................... | 428/300.4 |
| 4,696,711 A | * | 9/1987 | Greszczuk .................. | 156/173 |
| 4,882,118 A | * | 11/1989 | Megarry ..................... | 264/510 |
| 5,071,294 A | * | 12/1991 | Suzuki et al. ............... | 408/145 |
| 5,217,332 A | * | 6/1993 | Takasaki et al. ............. | 408/145 |
| 5,354,155 A | * | 10/1994 | Adams ....................... | 408/145 |
| 6,759,002 B1 | * | 7/2004 | Engwall et al. ............. | 264/510 |
| 7,575,401 B1 | * | 8/2009 | Garrick et al. .............. | 408/145 |

FOREIGN PATENT DOCUMENTS

| | | | |
|---|---|---|---|
| FR | 2656554 | * | 7/1991 |
| GB | 2074060 | * | 10/1981 |
| JP | 63-306812 A | | 12/1988 |
| JP | 2-237709 A | | 9/1990 |
| JP | 2001-293604 A | | 10/2001 |
| WO | WO2004082874 | * | 9/2004 |

* cited by examiner

*Primary Examiner*—Joseph S Del Sole
*Assistant Examiner*—Robert Dye
(74) *Attorney, Agent, or Firm*—Birch, Stewart, Kolasch & Birch, LLP

(57) ABSTRACT

A method for producing a fiber-reinforced composite member with connecting holes, comprising boring a cured molding of prepregs of reinforcing fibers impregnated with a matrix resin to form the connecting holes, using a burnishing drill comprising two or more tapered tip blades, two or more circumferential blades extending continuously from the tip blades to a shank, and chip-discharging grooves extending from the tip blades to the shank.

6 Claims, 21 Drawing Sheets

Fig. 2B-1
Fig. 2B-2
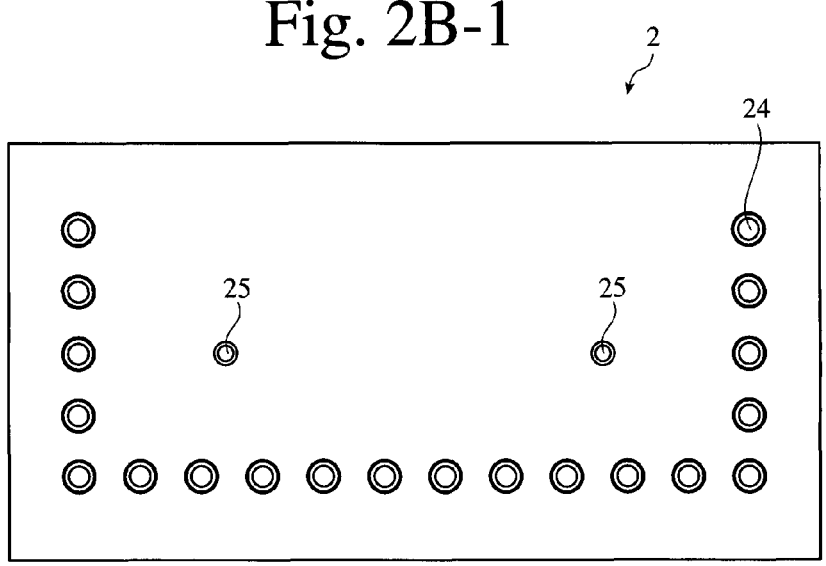
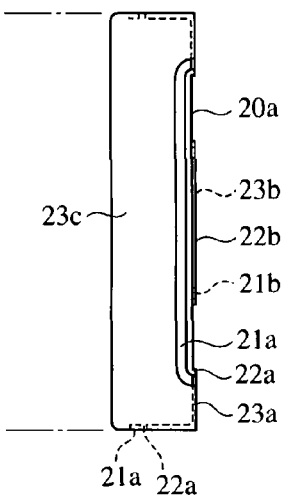
Fig. 2B-3
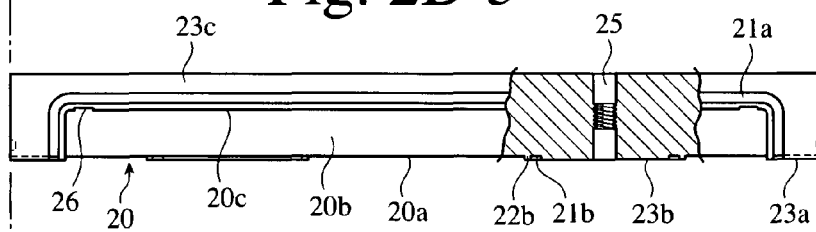
Fig. 2B-4
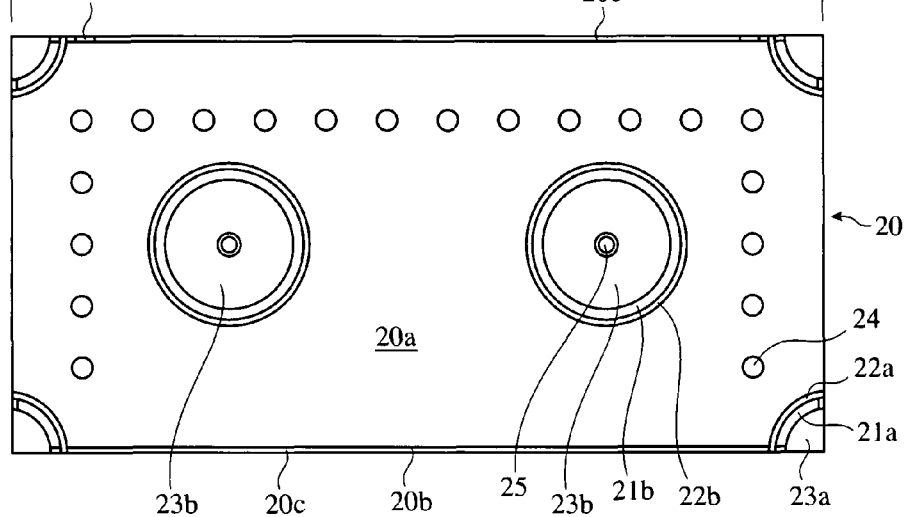

Fig. 2C-1
Fig. 2C-2
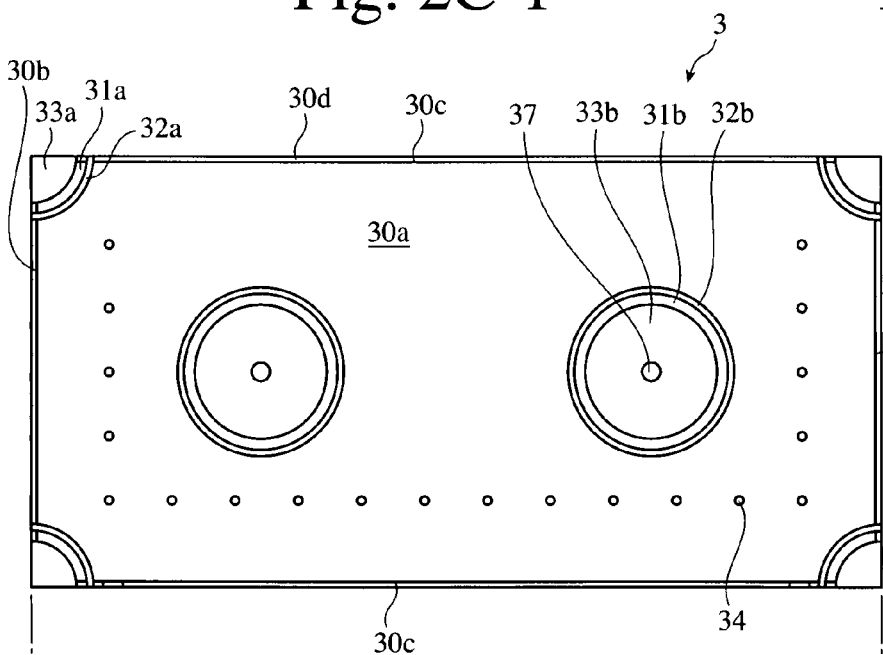
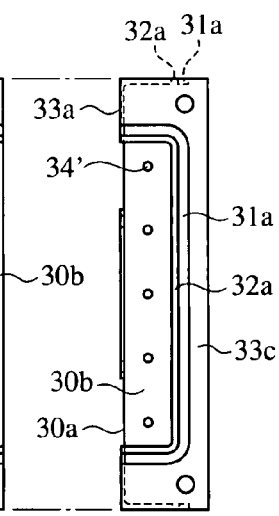
Fig. 2C-3
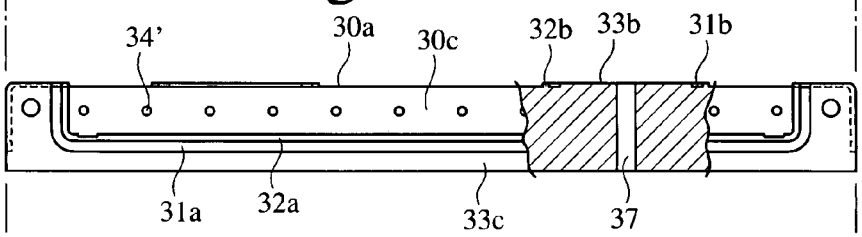
Fig. 2C-4
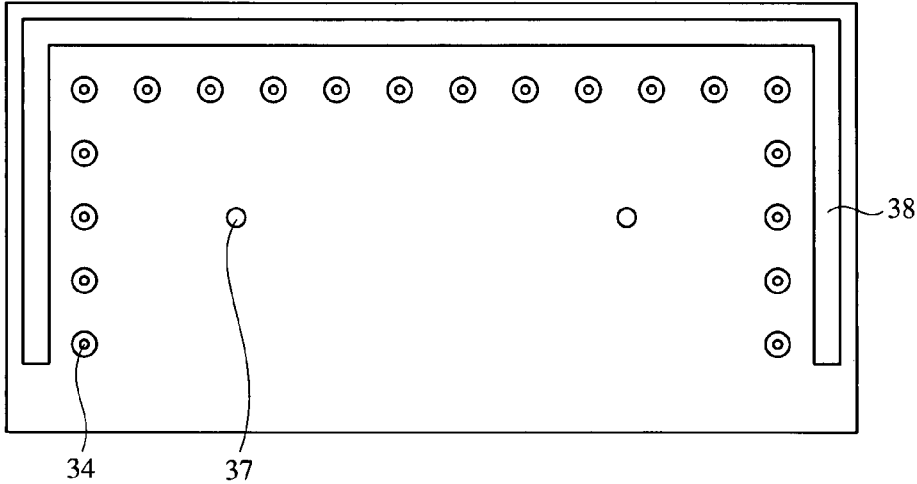

METHOD FOR PRODUCING FIBER-REINFORCED COMPOSITE MEMBER WITH CONNECTING HOLES, AND STRUCTURAL MEMBER FOR AIRCRAFTS CONSTITUTED BY SUCH COMPOSITE MEMBERS

FIELD OF THE INVENTION

The present invention relates to a method for producing a fiber-reinforced composite member with connecting holes having high dimensional accuracy and roundness and low surface roughness at a low cost, and a structural member for aircrafts constituted by such composite member.

BACKGROUND OF THE INVENTION

Fiber-reinforced composite members constituted by lightweight, high-strength carbon-fiber-reinforced plastics (CFRPs), etc. are widely used for structural members for aircrafts, etc. To connect fiber-reinforced composite members to each other, or fiber-reinforced composite members and metal members, each member is bored and riveted. Twist drills having chip-discharging spiral grooves from tip ends to shanks are conventionally used to bore the fiber-reinforced composite members. However, cutting is difficult in the fiber-reinforced composite members containing reinforcing fibers. Boring with a twist drill leaves burr on a cut surface and fibers projecting from the cut surface. Also, vibration during drilling causes delamination from the cut surface, resulting in strength decrease and fatigue failure. Accordingly, pluralities of twist drills with different diameters are used successively from a smaller-diameter one to expand the diameters of holes, and finishing is conducted by a reamer, resulting in large numbers of steps.

As a drill for boring stacked composite member and metal member without causing delamination in the composite member, JP 63-306812 A proposes a twist drill comprising first blades slanting at a large angle such that their gaps widen as going rearward from a tip center, and second blades continuous to the first blades and slanting at a smaller angle, in a tip end portion.

As a twist drill for boring CFRP without burr and projecting fibers, JP 2-237709 A proposes a twist drill comprising a tip blade consisting of a candle-point-type, inner part and a fishtail-type outer part, which are connected in a V shape.

JP 2001-293604 A proposes a method for boring a composite by a rotating tool, the tool having blades having a circular locus having a desired diameter. This method can be conducted with fewer cutting tools, resulting in a simpler cutting step, generating fewer chips while preventing burring and delamination.

However, the boring of CFRP using the twist drills described in JP 63-306812 A and JP 2001-293604 A or by the method described in JP 2001-293604 A would fail to provide holes with sufficiently high dimensional accuracy and roundness and low surface roughness. With holes having poor dimensional accuracy and roundness, riveted portions are vulnerable to displacement, and cracking likely occurs from rivet holes when a large load is applied to the riveted portions. As a result, high strength and durability cannot be obtained in riveted portions between fiber-reinforced composite members, or between fiber-reinforced composite members and metal members. To increase the dimensional accuracy and roundness of holes, reaming, etc. are needed, inevitably resulting in higher production cost.

Known as tools capable of conducting drilling and reaming simultaneously are burnishing drills having drilling blades and reaming blades. However, the burnishing drills are generally used to bore metal members, but there are no precedents of using the burnishing drills to bore fiber-reinforced composite members.

OBJECTS OF THE INVENTION

Accordingly, an object of the present invention is to provide a method for producing a fiber-reinforced composite member with connecting holes having high dimensional accuracy and roundness and low surface roughness at a low cost.

Another object of the present invention is to provide a structural member for aircrafts constituted by such fiber-reinforced composite members with connecting holes.

DISCLOSURE OF THE INVENTION

As a result of intense research in view of the above objects, the inventors have found that connecting holes having high dimensional accuracy and roundness and low surface roughness can be formed in the fiber-reinforced composite member at a low cost, by using a burnishing drill comprising tip blades for forming holes with rough inner surfaces and circumferential blades for reaming the inner surfaces of the holes. The present invention has been completed based on such finding.

Thus, the method of the present invention for producing a fiber-reinforced composite member with connecting holes comprises boring a cured molding of prepregs of reinforcing fibers impregnated with a matrix resin to form the connecting holes, using a burnishing drill comprising two or more tapered tip blades, two or more circumferential blades extending continuously from the tip blades to a shank, and chip-discharging grooves extending from the tip blades to the shank. By one boring step using the above burnishing drill, drilling and reaming can be conducted simultaneously.

The cured prepreg molding is preferably produced by placing the prepregs in a cavity of a molding die, cutting off excess margins of the prepregs along the edges of the cavity, and curing the matrix resin.

The cured prepreg molding member preferably has a rectangular, flat panel portion and at least one flange extending from its edge, and the cavity of the molding die preferably has a horizontal portion for supporting the rectangular, flat panel portion and at least one vertical portion for supporting the flange.

It is preferable that the molding die comprises upper and lower dies, at least one of which has a cavity, that the horizontal portions of the upper and lower dies have aligned holes, and that the burnishing drill is inserted into the holes to form connecting holes in the rectangular, flat panel portion of the cured prepreg molding held in the cavity.

A cylindrical guide plug is preferably fixed in each hole provided in the horizontal portion of the upper die cavity, and the burnishing drill is preferably inserted into the guide plug to bore the cured prepreg molding.

The burnishing drill is preferably inserted into each hole provided in the vertical portions of the upper die and/or the lower die, to bore a flange of the cured prepreg molding in the cavity. A cylindrical guide plug is preferably fixed in each hole provided in a boring jig abutting the flange of the cured prepreg molding, and the burnishing drill is preferably inserted into the guide plug to bore the cured prepreg molding.

The fiber-reinforced composite member with connecting holes produced by the method of the present invention is suitable for an aircraft structural member.

BRIEF DESCRIPTION OF THE DRAWINGS

FIG. 2B-1 is a plan view showing an upper die in FIG. 2A.

FIG. 2B-2 is a transverse side view showing an upper die in FIG. 2A.

FIG. 2B-3 is a longitudinal side view showing an upper die in FIG. 2A.

FIG. 2B-4 is a bottom view showing an upper die in FIG. 2A.

FIG. 2C-1 is a plan view showing a lower die in FIG. 2A.

FIG. 2C-2 is a transverse side view showing a lower die in FIG. 2A.

FIG. 2C-3 is a longitudinal side view showing a lower die in FIG. 2A.

FIG. 2C-4 is a bottom view showing a lower die in FIG. 2A.

FIG. 5E-1 is a plan view showing an excess-margin-removed prepreg laminate in a lower die cavity.

FIG. 5E-2 is a side view showing an excess-margin-removed prepreg laminate in a lower die cavity.

DESCRIPTION OF THE BEST MODE OF THE INVENTION

Figure 1:
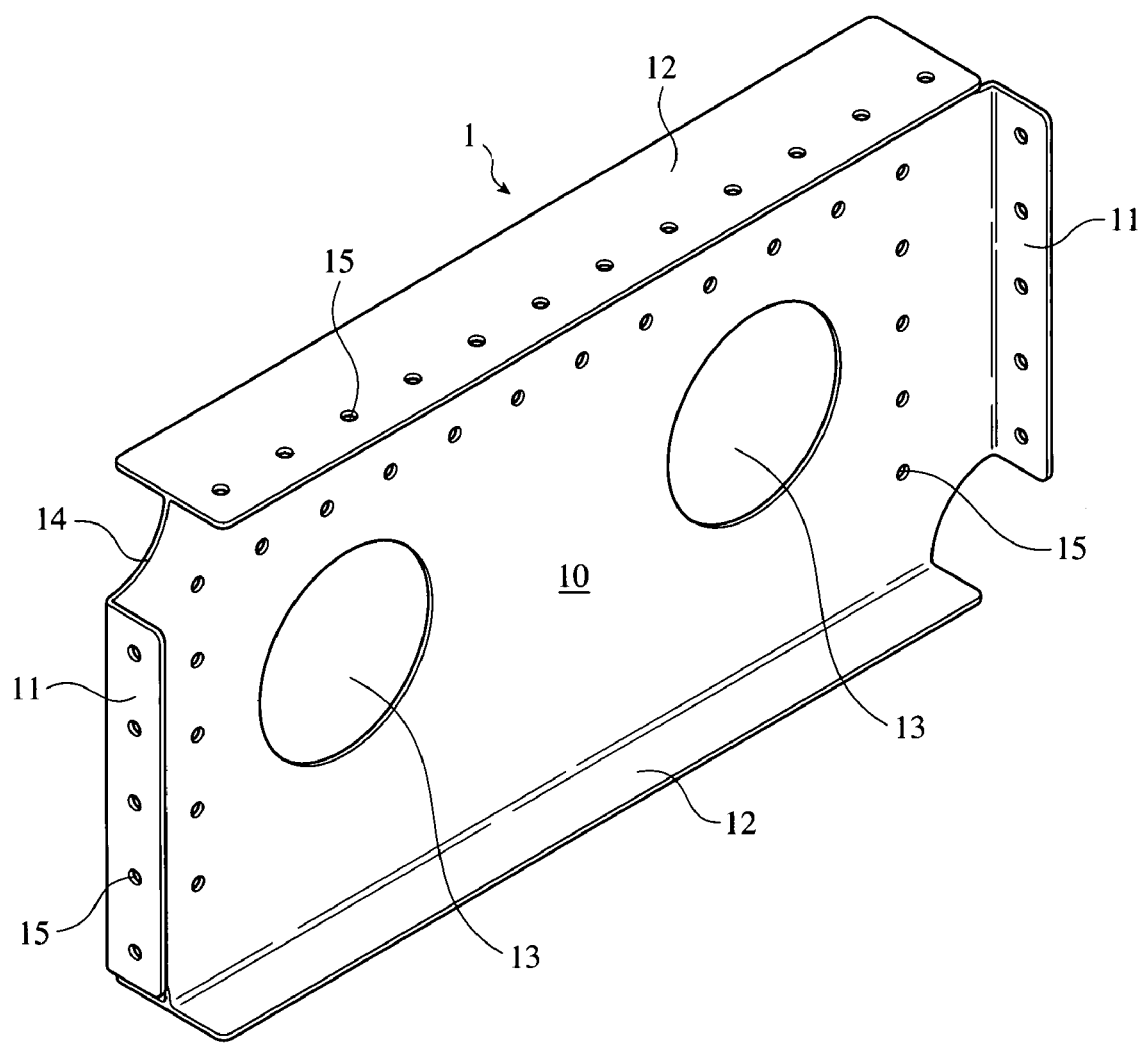
FIG. 1 is a perspective view showing an example of fiber-reinforced composite members with connected holes produced by the method of the present invention.
Figure 2A:
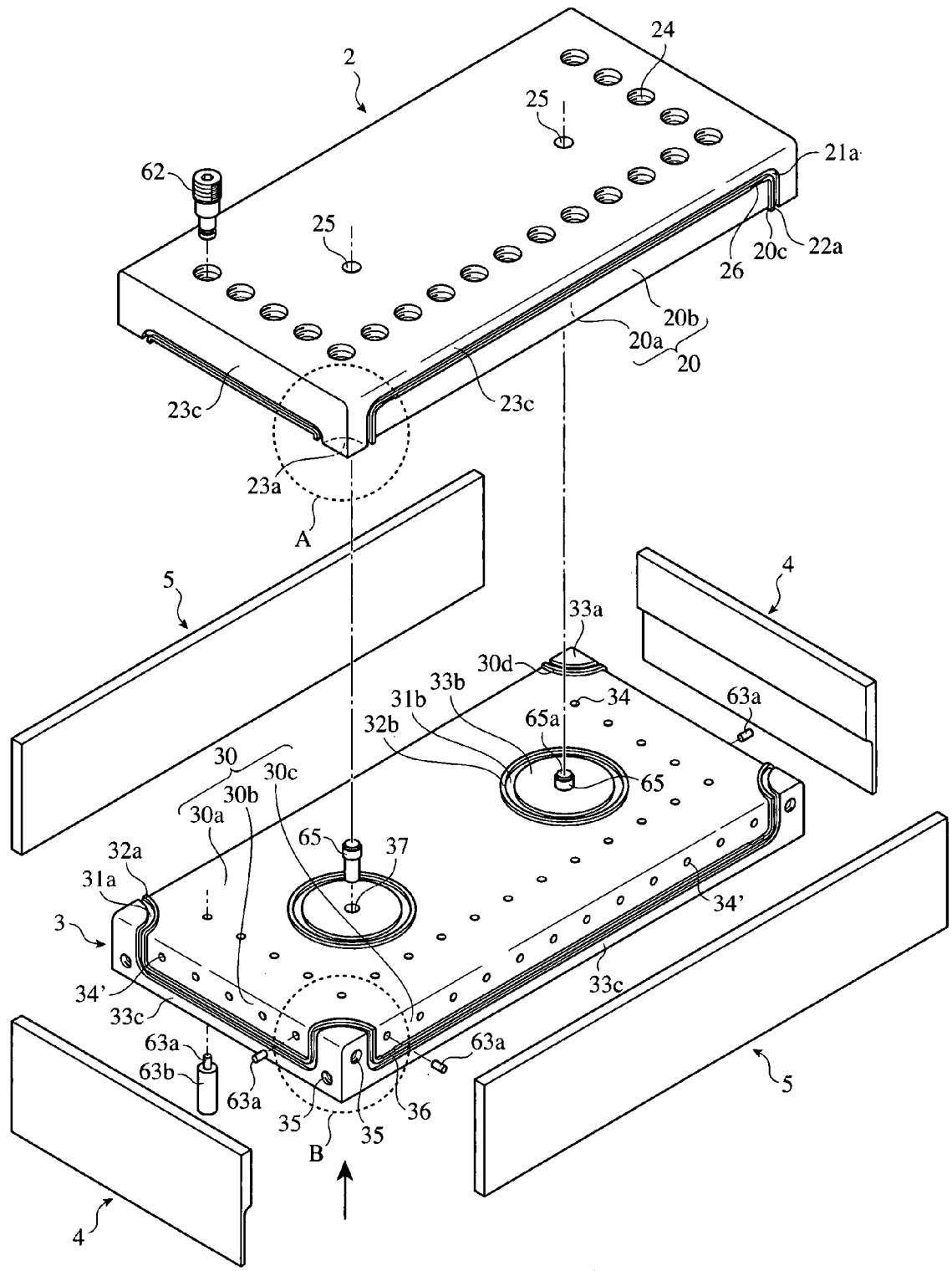
FIG. 2A is an exploded perspective view showing an example of dies for forming the fiber-reinforced composite member with connecting holes of FIG. 1.

[1] Production Method of Fiber-Reinforced Composite Member with Connecting Holes FIG. 1 shows an example of fiber-reinforced composite members with connected holes produced by the method of the present invention. This panel-shaped, fiber-reinforced composite member 1 with connecting holes, which is produced by curing prepregs of reinforcing fibers impregnated with a matrix resin, comprises a rectangular, flat panel portion 10, flanges 11, 11 extending from both transverse side edges of the flat panel portion 10 on one side, flanges 12, 12 extending from both longitudinal side edges of the flat panel portion 10 on both sides, circular holes 13, 13 provided in the flat panel portion 10 for weight reduction, and circular notches 14 provided at four corners of the flat panel portion 10. The flat panel portion 10, flanges 11, 11 and one flange 12 of the panel-shaped, fiber-reinforced composite member 1 are provided with holes 15 for connection to other members with fasteners such as rivets, etc. Taking for example the molding of the panel-shaped, fiber-reinforced composite member 1 with connecting holes shown in FIG. 1, the method of the present invention will be explained below.

(1) Molding Die (a) Shape

Figure 4A:
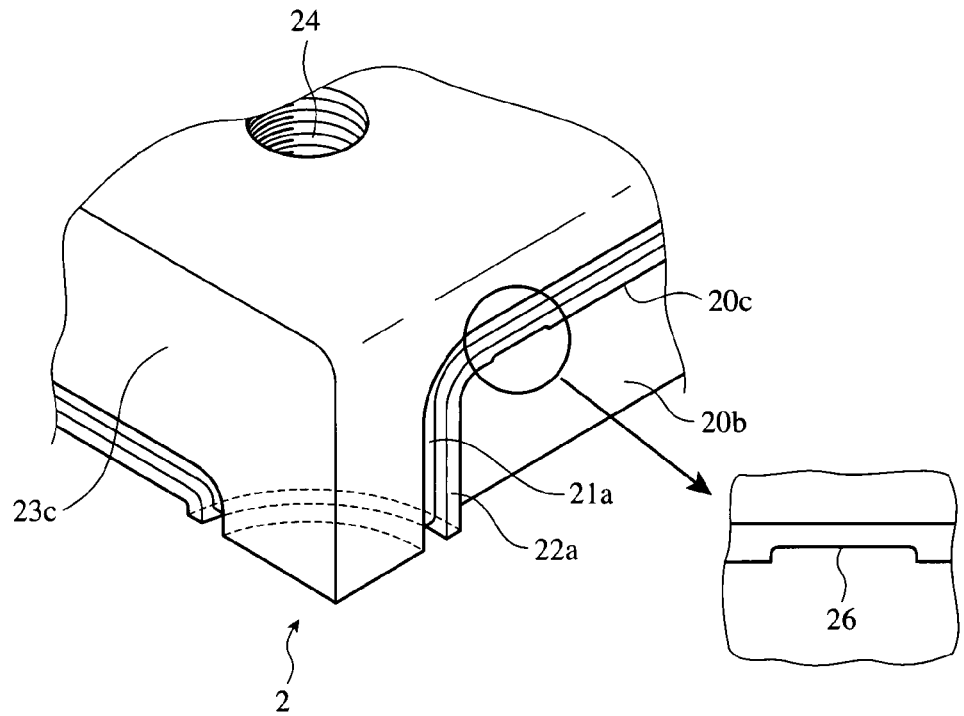
FIG. 4A is an enlarged perspective view showing a portion A in FIG. 2A.
Figure 4B:
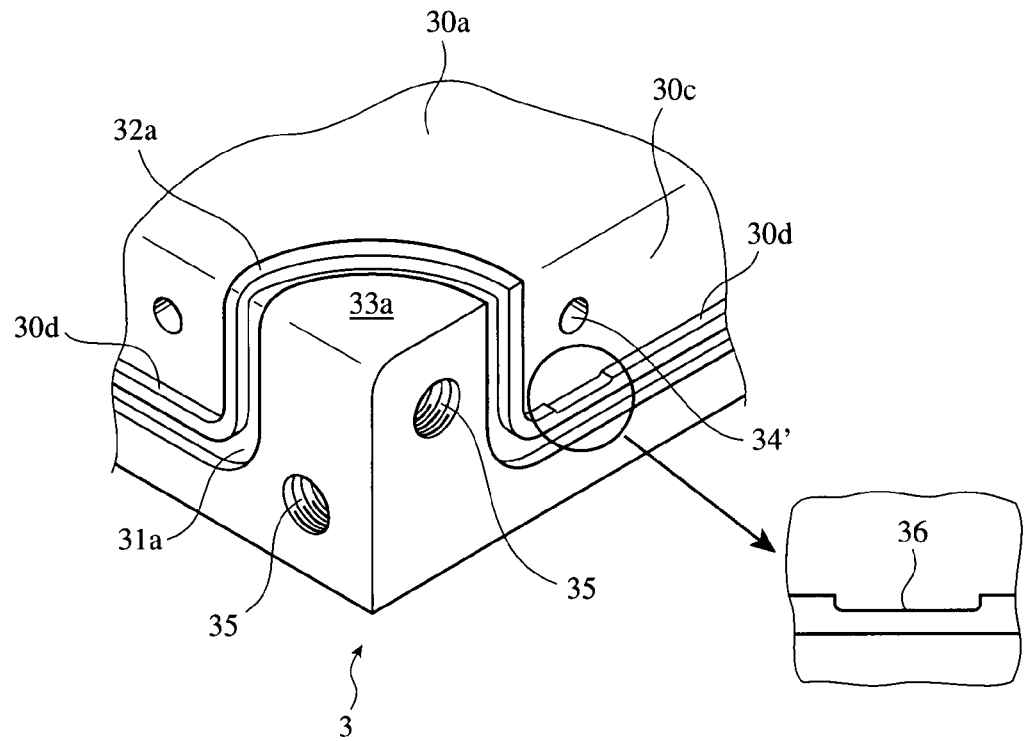
FIG. 4B is an enlarged perspective view showing a portion B in FIG. 2A.
Figure 5A:
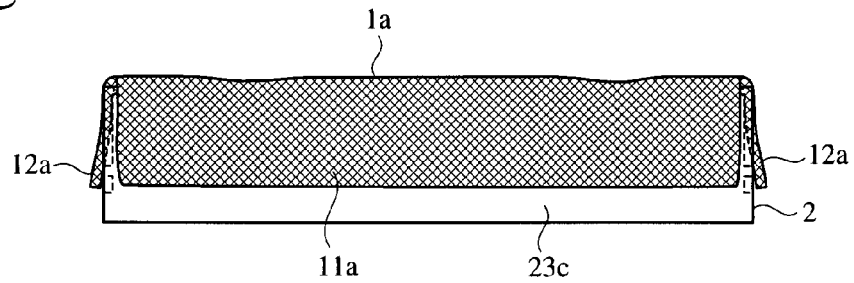
FIG. 5A is a side view showing a prepreg laminate placed on the upper die.
Figure 5B:
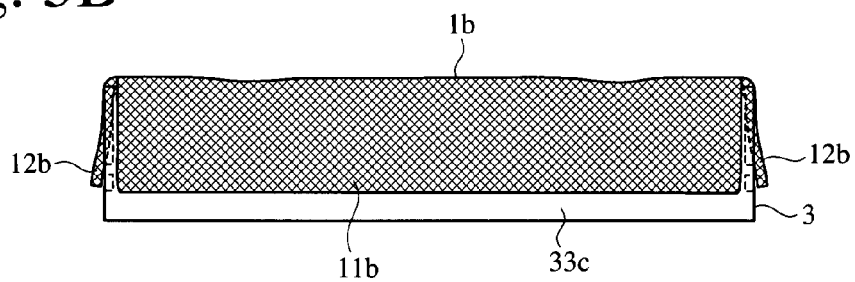
FIG. 5B is a side view showing a prepreg laminate placed on the lower die.
Figure 5C:
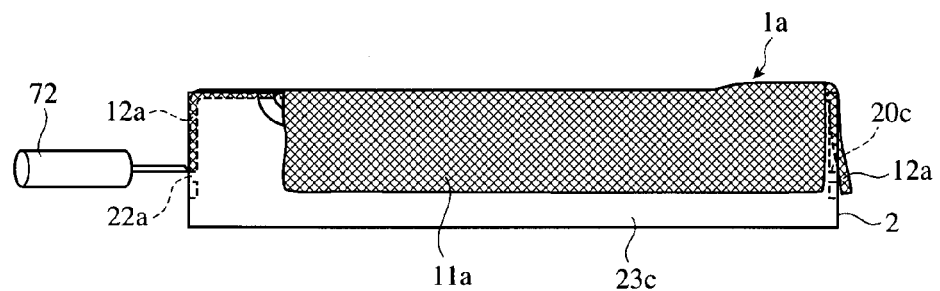
FIG. 5C is a side view showing the cutting of a transverse excess margin of the prepreg laminate placed on the upper die.
Figure 5D:
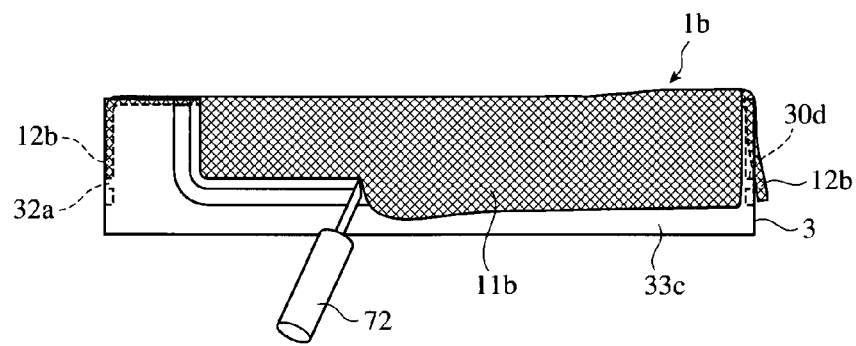
FIG. 5D is a side view showing the cutting of a transverse excess margin of the prepreg laminate placed on the lower die.
Figures 1, 5E:
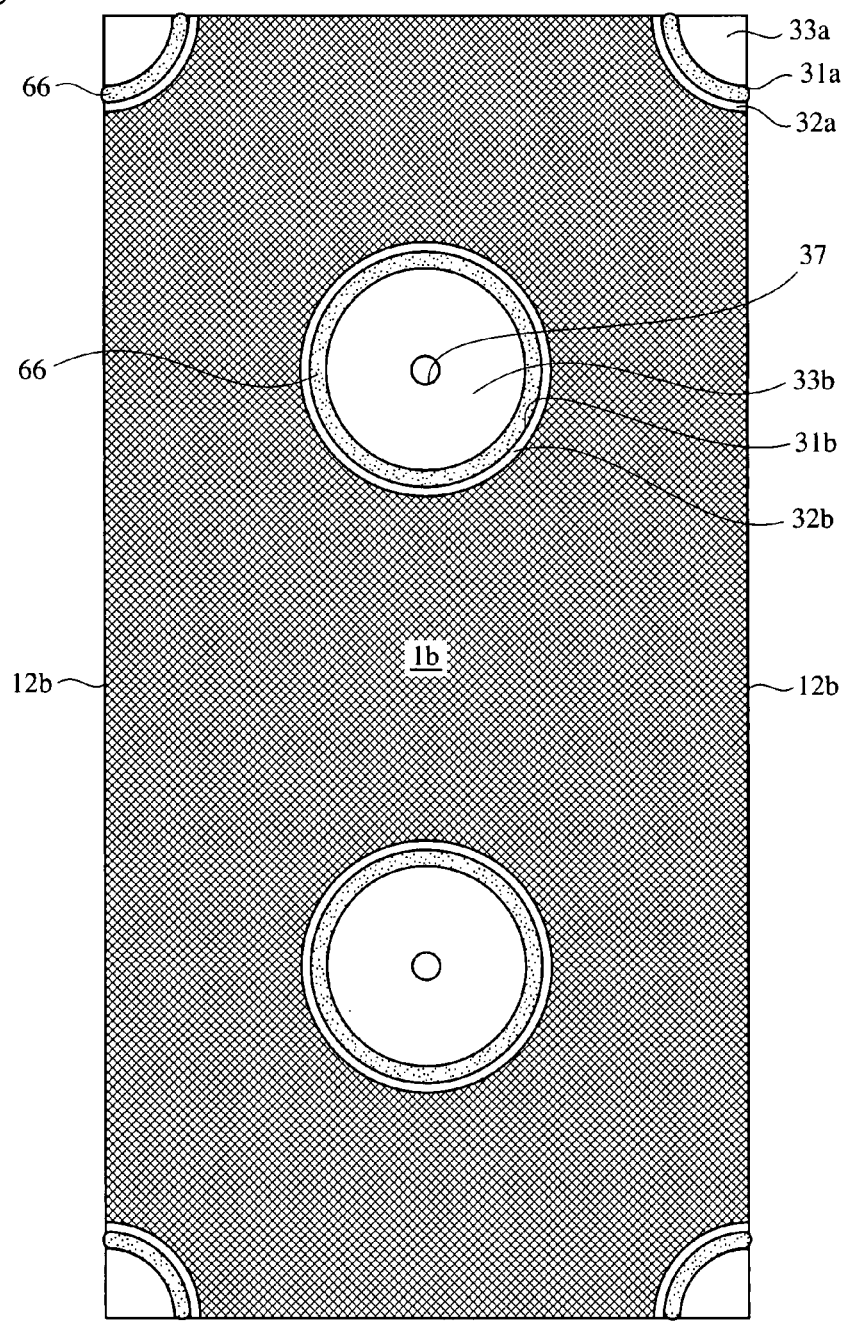
Figures 2, 5E:
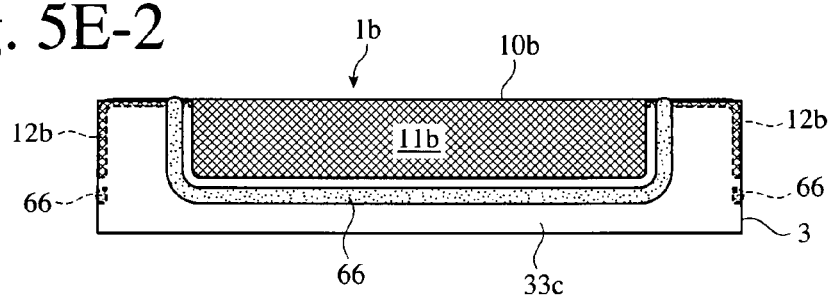

FIGS. 2-4 show one example of dies for forming the panel-shaped, fiber-reinforced composite member 1 with connecting holes shown in FIG. 1. This molding die comprises upper and lower dies 2, 3 having cavities 20, 30 for forming the flat panel portion 10 and flanges 11, 11, 12, 12 of the fiber-reinforced composite member 1 with connecting holes, and side dies 4, 4, 5, 5 clamped to the upper and lower dies 2, 3.

The upper die 2 has a cavity 20 comprising a horizontal portion 20a for forming the flat panel portion 10 of the panel-shaped, fiber-reinforced composite member 1 with connecting holes, and vertical portions 20b, 20b for forming the flanges 12, 12 of the panel-shaped, fiber-reinforced composite member 1 with connecting holes. The upper die 2 has fan-shaped projections 23a, 23a, 23a, 23a with their circular sides inside at four corners of the horizontal portion 20a, and flat sides of each fan-shaped projection 23a extend slightly outward from the vertical portions 20b, 20b. Because each vertical portion 20b extends to a certain vertical position of the upper die 2, the root portions (upper portions) of the adjacent fan-shaped projections 23a are connected through a horizontal projection 23c extending along the upper surface of the upper die 2. Because a groove 21a for receiving a resin-leak-preventing seal 66 extends along the peripheral edge of the cavity 20, a flange 22a is provided between the peripheral edge of the cavity 20 and the groove 21a.

The horizontal portion 20a has a pair of circular projections 23b, 23b in its center portions, to form circular holes 13, 13 in the fiber-reinforced composite member 1 with connecting holes. Each circular projection 23b has a hole 25 in its center, into which a pin 65 described later is inserted. There is an annular groove 21b for receiving a resin-leak-preventing seal 66 between each circular projection 23b and an annular flange 22b of the same height provided around the circular projection 23b.

Figure 3A:
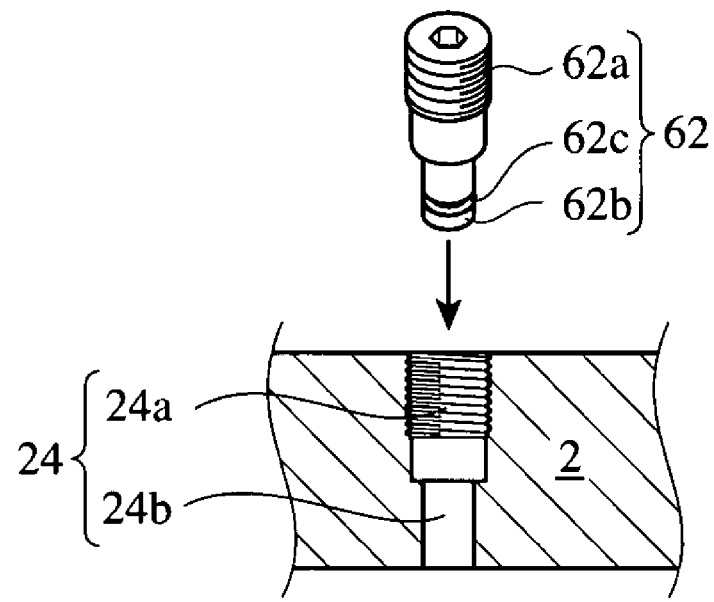
FIG. 3A is a partial cross-sectional view showing a pin mechanism provided in the upper die.

The upper die 2 has holes 24, into which a burnishing drill is inserted to form connecting holes 15 in the fiber-reinforced composite member 1. As shown in FIG. 3A, each hole 24 has a large-diameter, threaded portion 24a, and a small-diameter, not-threaded portion 24b from above. A resin-leak-preventing plug 62 for the upper die 2 has a complementary shape to the hole 24, with a threaded head 62a threadably engageable with the large-diameter, threaded portion 24a. A tip-end portion 62b inserted into the small-diameter hole portion 24b is provided with an O-ring 62c made of, for instance, silicone rubbers, fluororubbers, etc., to prevent resin leak. When the plug 62 is screwed into the hole 24, a tip-end surface of the small-diameter hole portion 24b is on the same plane as the horizontal portion 20a of the cavity 20.

As shown in FIG. 4A, to pry the resultant fiber-reinforced composite member 1 with connecting holes out of the upper die 2, the upper die 2 properly has a shallow groove 26 on an inner surface of the flange 22a (end surface 20c of the cavity 20), into which a flat-tip tool such as a minus driver, etc. is inserted.

The lower die 3 has a shape corresponding to that of the upper die 2. A cavity 30 of the lower die 3 has a horizontal portion 30a for forming the flat panel portion 10 of the fiber-reinforced composite member 1 with connecting holes, vertical portions 30b, 30b for forming the transverse flanges 11, 11 of the fiber-reinforced composite member 1 with connecting holes, and vertical portions 30c, 30c for forming the longitudinal flanges 12, 12 of the fiber-reinforced composite member 1 with connecting holes. There are fan-shaped projections 33a, 33a, 33a, 33a having the same shape as that of the fan-shaped projections 23a, 23a, 23a, 23a of the upper die 2 at four corners of the horizontal portion 30a, with flat side surfaces of each fan-shaped projection 33a slightly projecting from the vertical portions 30b, 30b, 30c, 30c. Because each vertical portion 30b, 30c reaches a certain vertical position of the lower die 2, the root portions (lower portions) of the adjacent fan-shaped projections 33a are connected by a horizontal projection 33c extending along the lower surface of the lower die 3. Because a groove 31a for receiving the resin-leak-preventing seal 66 is formed around the periphery of the cavity 30, a flange 32a is formed between the peripheral edge of the cavity 30 and the groove 31a.

The horizontal portion 30a has a pair of circular projections 33b, 33b in its center portions, to form circular holes 13, 13 in the fiber-reinforced composite member 1 with connecting holes. There is an annular groove 31b for receiving the resin-leak-preventing seal 66 between each circular projection 33b and an annular flange 32b of the same height provided around the circular projection 33b. Each circular projection 33b has a hole 37 at center, into which a pin 65 is inserted. Because the pin 65 has a head 65a having a larger diameter than that of the hole 37, the head 65a of each pin 65 inserted into the hole 37 does not enter into the hole 37 but is received in the hole 25 of the upper die 2, resulting in the positing of the lower die 3 relative to the upper die 2.

Figure 3B:
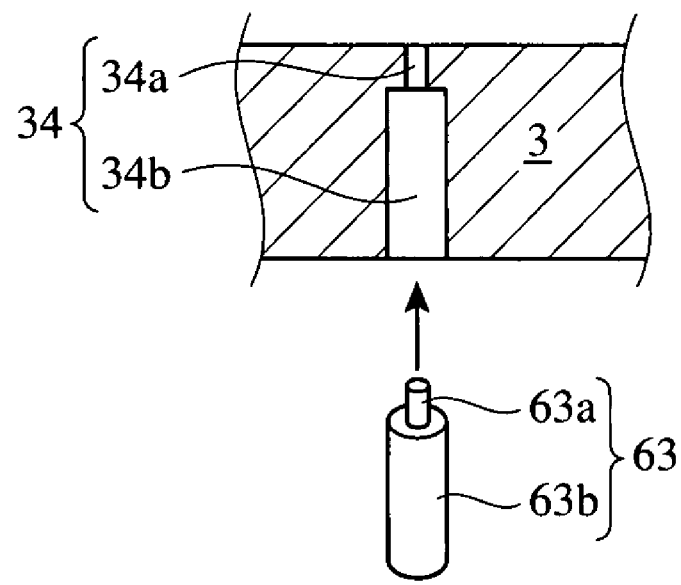
FIG. 3B is a partial cross-sectional view showing a pin mechanism provided in the lower die.

The lower die 3 has holes 34 in its horizontal portion 30a, which are vertically aligned with the holes 24 of the upper die 2. One vertical portion 30b and both vertical portions 30c, 30c have holes 34'. The holes 34, 34' having the same diameter receive a burnishing drill for forming connecting holes 15 in the fiber-reinforced composite member 1. As shown in FIG. 3B, each hole 34 has a small-diameter portion 34a and a large-diameter portion 34b from above. A resin-leak-preventing plug 63 for the lower die 3 comprises a small-diameter portion 63a fit into the small-diameter hole portion 34a, and a large-diameter portion 63b received in the large-diameter hole portion 34b. Though not shown, the large-diameter portion 63b may be threaded to the large-diameter hole portion 34b if necessary, to prevent the plugs 63 from detaching during molding. A tip-end surface of the plug 63 received in the hole 34 or 34' is on the same plane as the horizontal portion 30a or vertical portion 30b, 30c of the cavity 30. The lower die 3 is provided on its lower surface with a groove 38 for removing the plug 63 from the holes 34' after curing the matrix resin, along the vertical portions 30b, 30c of the cavity 30.

As shown in FIG. 4B, the lower die 3 is also provided with a shallow groove 36 on an inner surface of the flange 32a (end surface 30d of the cavity 30), into which a flat-tip tool for prying the resultant fiber-reinforced composite member 1 with connecting holes out of the lower die 3 is inserted.

Because the cured fiber-reinforced composite member 1 with connecting holes tends to become thicker by about 0.1 mm after opening the die, a cavity constituted by the cavities 20, 30 of the upper and lower dies 2, 3 is preferably set thinner by about 0.1 mm in advance.

(b) Materials

Materials for the upper and lower dies 2, 3 may be cast iron, cast steel (for instance, JIS SS400, etc.), carbon steel (for instance, JIS S45C-H, etc.), etc. Cast iron having a low linear thermal expansion coefficient is commercially available under the trademark of "NOBINITE" from Enomoto Chukousho Co., Ltd. Materials for the side dies 4, 5 may be aluminum, etc.

Materials for the plugs 62, 63 and the pins 65 may be alloyed steel (for instance, JIS SCM435H, etc.). Materials for the seal 66 may be rubbers having enough heat resistance to withstand the curing temperature, such as fluororubbers such as polytetrafluoroethylene (PTFE), silicone rubbers, etc. Commercially available PTFE seals include GORE-TEX No. 3300 available from Japan Gore-Tex Inc.

(2) Production Steps (a) Lamination of Prepregs

The resin-leak-preventing plugs 62, 63 are inserted into the holes 24 of the upper die 2 and the holes 34, 34' of the lower die 3 in advance. Pluralities of rectangular cloth prepreg sheets notched in a fan shape at four corners are laminated on the upper and lower dies 2, 3. As shown in FIGS. 5A and 5B, the prepreg laminates 1a, 1b on the upper and lower dies 2, 3 respectively have excess margins.

The cloth prepreg sheet is composed of a reinforcing fiber cloth impregnated with a matrix resin. The reinforcing fibers are not particularly restrictive, but may be properly selected from carbon fibers, aramide fibers, glass fibers, boron fibers, etc. depending on applications. The matrix resin is preferably a heat-setting resin, which may be properly selected from epoxy resins, polyurethanes, unsaturated polyesters, bismaleimide resins, phenol resins, etc. depending on applications. When the panel-shaped, fiber-reinforced composite member 1 with connecting holes is used for the aircraft structural member, the reinforcing fibers are preferably carbon fibers, and the matrix resin is preferably an epoxy resin.

(b) Cutting of Excess Margins

Figure 5F:
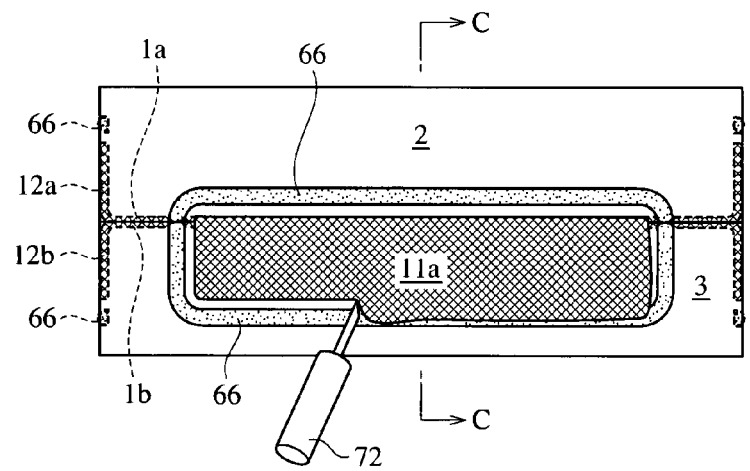
FIG. 5F is a side view showing the cutting of a transverse excess margin of a prepreg laminate placed on the upper die, which drapes on a prepreg laminate placed on the lower die.
Figure 5G:
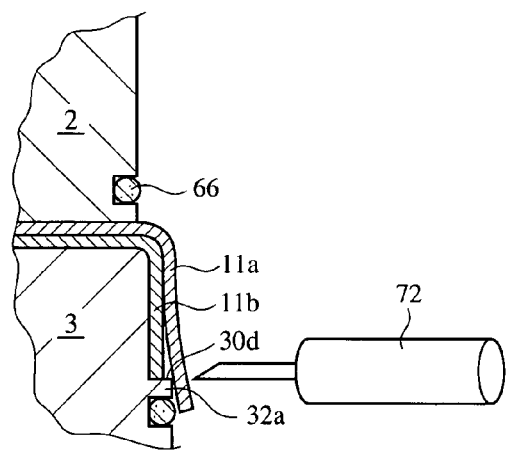
FIG. 5G is a partial cross-sectional view taken along the line C-C in FIG. 5F.

As shown in FIGS. 5C and 5D, using a trimming tool 72 such as a cutter, etc., the excess margin 12a of the prepreg laminate 1a is cut off or trimmed along the end surface 20c of the cavity 20 of the upper die 2, and the excess margins 11b, 12b of the prepreg laminate 1b are cut off along the end surface 30d of the cavity 30 of the lower die 3. As shown in FIG. 5E, the trimmed prepreg laminate 1b remains in the cavity 30 of the lower die 3. Seals 66 are fit into the grooves 21a, 21b of the upper die 2 and the grooves 31a, 31b of the lower die 3. Silicone sheets are inserted into the groove 26 of the upper die 2 and the groove 36 of the lower die 3. With the pins 65 inserted into the holes 37 of the lower die 3 and their heads 65a received in the holes 25 of the upper die 2, the upper die 2 is combined with the lower die 3 such that the prepreg laminates 1a, 1b come into contact with each other, as shown in FIG. 5F. In a state where the prepreg laminate 1a placed on the upper die 2 is draped on the prepreg laminate 1b placed on the lower die 3, the transverse excess margin 11a of the prepreg laminate 1a is cut off along the end surface 30d of the cavity 30 of the lower die 3, as shown in FIGS. 5F and 5G. The trimming is usually conducted at room temperature. Because excess margins are cut off from the easily trimmable uncured prepreg laminates 1a, 1b, fiber-reinforced composite members with good cut surfaces can be easily produced.

(c) Lamination of Prepregs for Flanges

Figure 5H:
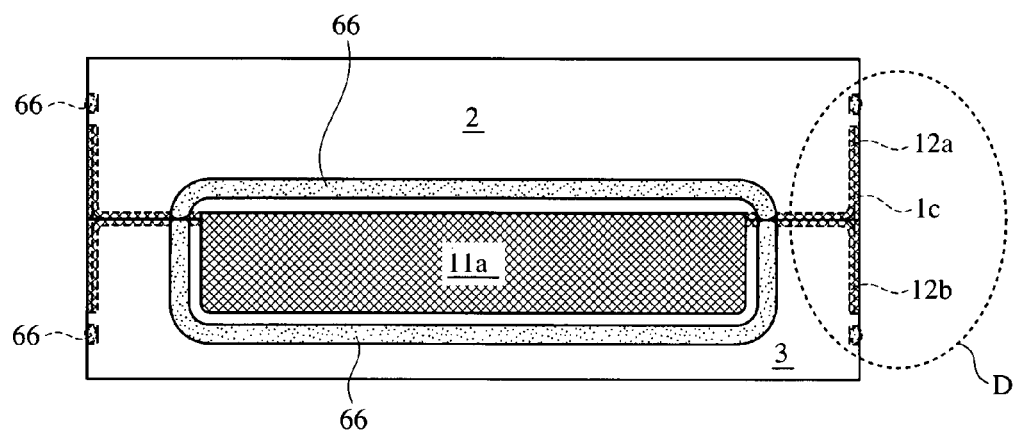
FIG. 5H is a side view showing a prepreg strip laminated on flanges of the prepreg laminates sandwiched by the upper and lower dies.
Figure 5J:
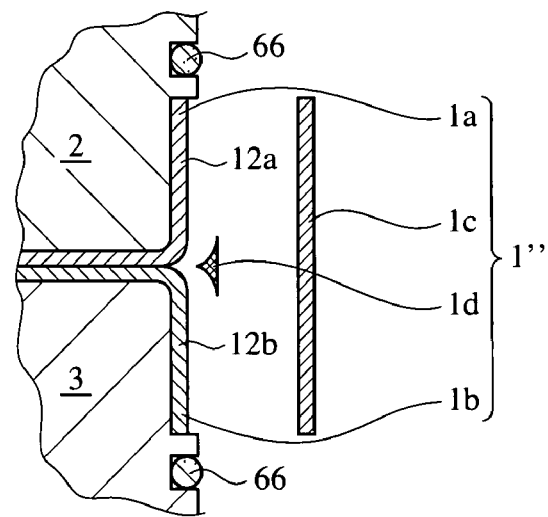
FIG. 5J is an enlarged cross-sectional view showing a portion D in FIG. 5H.

As shown in FIGS. 5H and 5J, a prepreg strip 1c is laminated on the flanges 12a, 12b of the prepreg laminates 1a, 1b via a filler 1d made of reinforcing fibers and a matrix resin, to strengthen the flanges 12, 12. Thus obtained is a prepreg molding 1" integrally comprising the prepreg laminates 1a, 1b, the prepreg strip 1c, and the filler 1d.

(d) Curing

Figure 6:
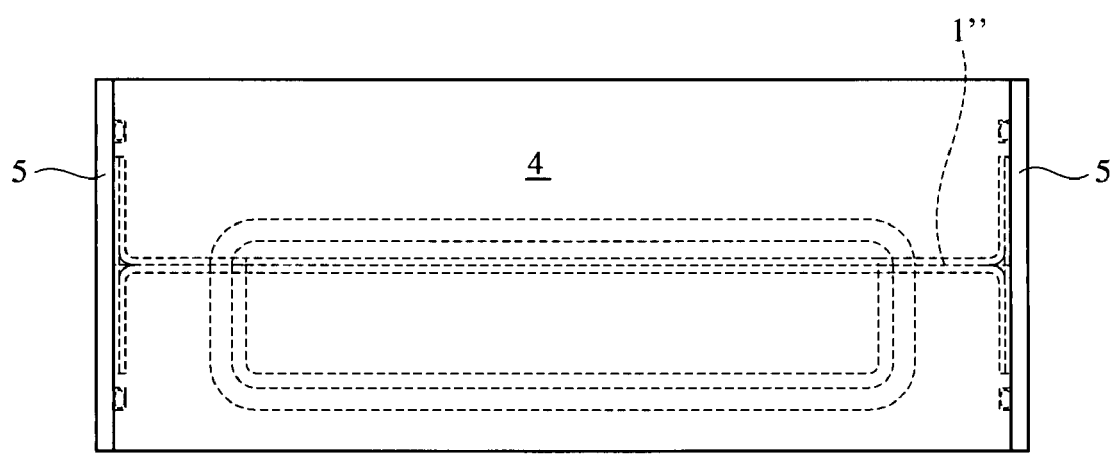
FIG. 6 is a side view showing side dies assembled to the closed upper and lower dies of FIG. 5J.
Figure 7:
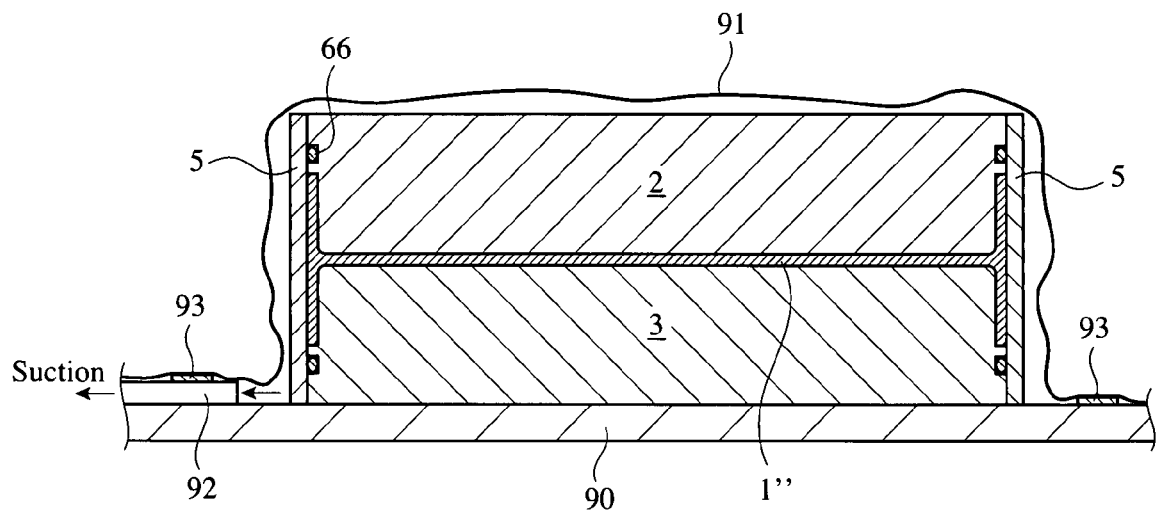
FIG. 7 is a cross-sectional view showing a prepreg molding and a molding die both covered with a bag film and evacuated.

As shown in FIG. 6, side dies 4, 4, 5, 5 are clamped to side surfaces of the combined upper and lower dies 2, 3, to support the flanges of the prepreg molding 1". The overall die is placed on a base plate 90 and covered with a bag film 91 as shown in FIG. 7. The bag film 91 is evacuated through a pipe 92 connected to a vacuum pump. To keep a vacuum state, the bag film 91 is adhered to an upper surface of the base plate 90 by an adhesive tape 93.

Figure 8:
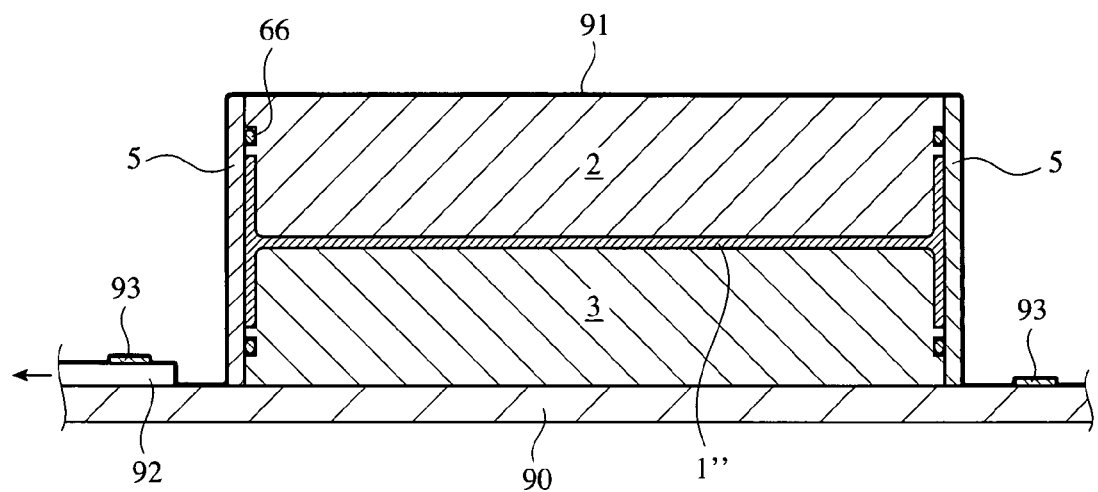
FIG. 8 is a cross-sectional view showing the prepreg molding and the molding die kept in vacuum.

Heating is conducted while keeping the bag film 91 in a vacuum state (see FIG. 8), to cure the matrix resin. Heating may be conducted in an oven, etc., but it is preferably conducted while pressurizing in an autoclave, etc. The heating temperature is preferably 120-180° C., though slightly different depending on the type of the heat-setting resin. When an autoclave is used, pressurization is preferably conducted at about 3-6 MPa.

(e) Boring

Connecting holes 15 are formed in the flat plate portion 10', flanges 11', 11' and flange 12' of the cured prepreg molding 1'.

(i) Burnishing Drill

Figure 9A:
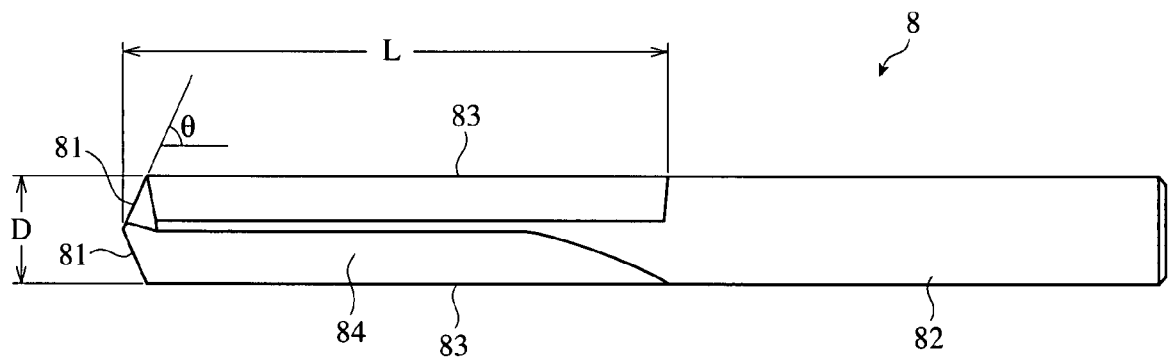
FIG. 9A is a side view showing an example of burnishing drills used for boring the cured prepreg molding.
Figure 9B:
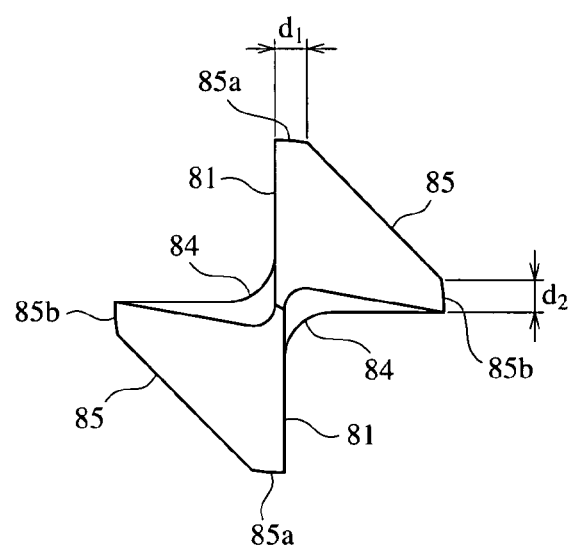
FIG. 9B is a front view showing the burnishing drill of FIG. 9A.

FIGS. 9A and 9B show an example of burnishing drills used for boring the cured prepreg molding 1'. The burnishing drill 8 comprises tapered tip blades 81, 81, circumferential blades 83, 83 extending continuously from the tip blades 81, 81 to a shank 82, and V-cross-sectioned, chip-discharging grooves 84, 84 extending from the tip blades 81, 81 to the shank 82. Each land 85 having a circumferential blade 83 has margins 85a, 85b on both circumferential end portions, which come into contact with an inner surface of each hole 15. The width $d_1$, $d_2$ of each margin 85a, 85b may be set properly depending on the diameter of each hole 15 and the thickness of the cured prepreg molding 1'.

The burnishing drill 8 is not restricted to have the depicted structure, as long as it has the tapered tip blades 81, 81 and the circumferential blades 83, 83. For instance, the land 85 may be provided with a groove for flowing a cutting fluid. The inclination angle θ of each tip blade 81, 81 may be smaller on the side of the circumferential blade 83, 83. The circumferential blades 83, 83 may be spiral. The burnishing drill 8 is preferably made of cemented carbide at least in a region having blades.

Such burnishing drill is disclosed by, for instance, JP 2981055 B, JP 2572128 B, JP 6-31516 A, JP 6-39617 A, JP 7-108409 A, JP 2002-301616 A, JP 2006-95662 A, JU 2601362 B, JU 7-31926 B, JU 6-45287 B, JU 6-32254 B, JU 6-32253 B, JU 5-36566 B, JU 3-25856 B, JU 7-044681 A, JU 2-97510 A, etc. Burnishing drills are commercially available from Burnishing Tool Co., Ltd., etc.

(ii) Boring

Figure 10:
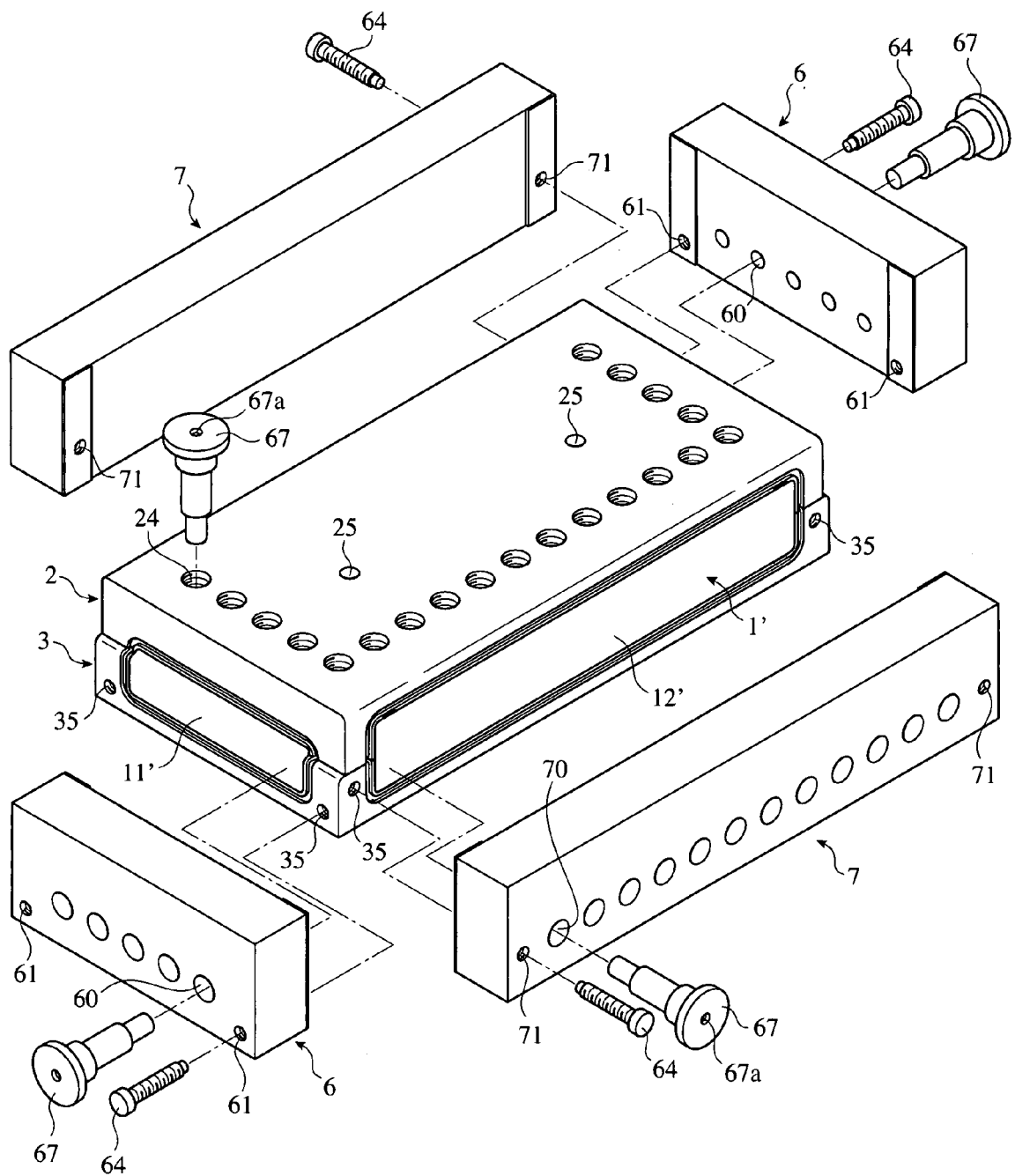
FIG. 10 is an exploded perspective view showing an example of jigs used for boring the cured prepreg molding.

After the side dies 4, 4, 5, 5 are detached, as shown in FIG. 10, boring planar jigs 6, 6, 7, 7 are fixed to the lower die 3, with shouldered bolts 64 screwed into the holes 35 through the holes 61, 71 of the boring planar jigs 6, 6, 7, 7. Each boring jig 6, 7 has holes 60, 70, into which a burnishing drill 8 is inserted via a guide plug 67 to form holes 15 in the cured prepreg molding 1' in the die. The boring jigs 6, 7 may be made of aluminum, etc. The shouldered bolts 64 may be made of alloyed steel such as JIS SCM435H, etc.

Figure 11:
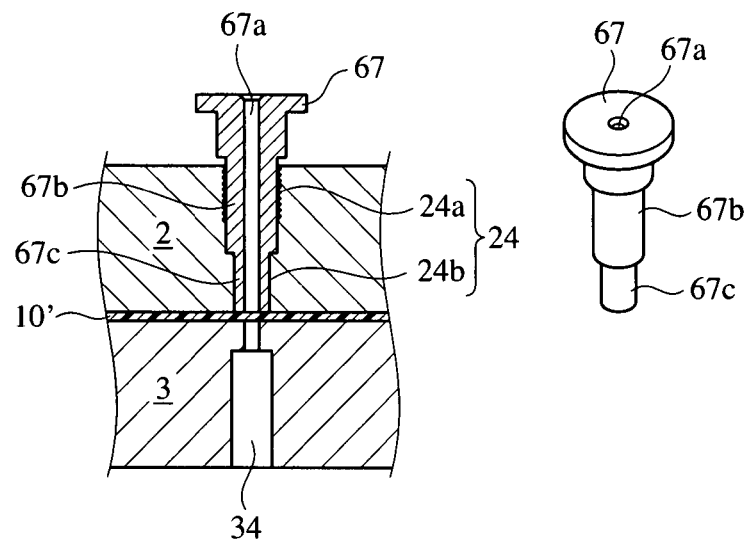
FIG. 11 is a partial cross-sectional view showing a guide plug inserted into each hole of the upper die.

The resin-leak-preventing plugs 62, 63 are detached from the holes 24, 34, 34' of the dies 2, 3. As shown in FIG. 10, tubular guide plugs 67 each having a hole 67a are inserted into the holes 24, 60, 70 of the upper die 2 and the boring jigs 6, 7. As shown in FIG. 11, each guide plug 67 comprises a large-diameter portion 67b fit into the large-diameter portion 24a of the hole 24, and a small-diameter portion 67c fit into the small-diameter hole portion 24b of the hole 24. Because the holes 60, 70 of the jigs 6, 7 have the same shape as that of the holes 24 except for having no threaded portions, they are engageable with the guide plugs 67.

Figure 12:
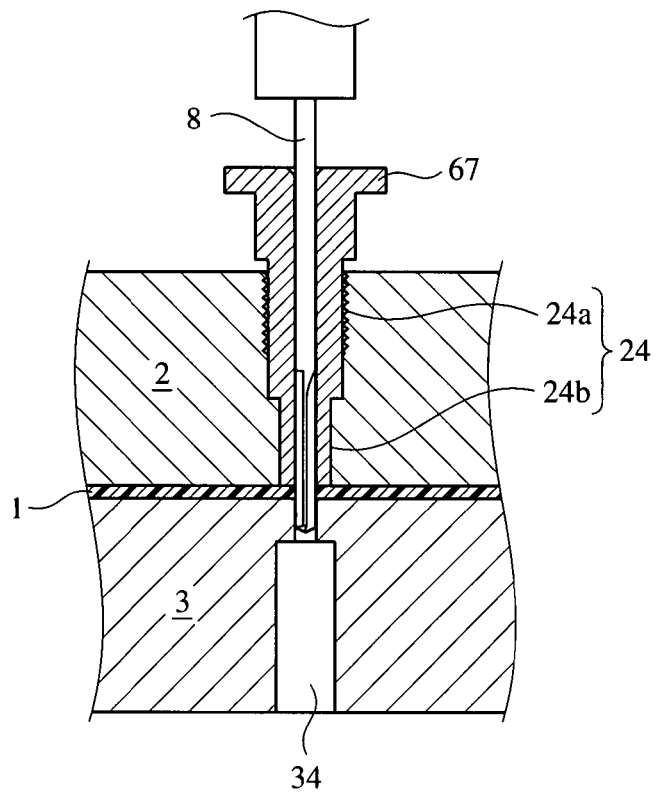
FIG. 12 is a partial cross-sectional view showing the boring of the cured prepreg molding.

As shown in FIG. 12, the burnishing drill 8 is inserted into each hole 67a of the guide plug 67, to bore the cured prepreg molding 1'. To provide the holes 15 with improved dimensional accuracy, the hole 67*a* of the guide plug 67 preferably has a diameter more than the diameter D of the burnishing drill 8 and D+50 μm or less. With the guide plugs 67 fit into the holes 24, 60, 70, the cured prepreg molding 1' is vertically bored. Because the cured prepreg molding 1' held in the dies 2, 3 are bored using the boring jigs 6, 7 having holes 60, 70, the connecting holes 15 can be formed accurately and efficiently.

The rotation and feed speeds of the burnishing drill 8 may be properly determined depending on such conditions as the thickness of the cured prepreg molding 1', the diameter of the holes 15, necessary dimensional accuracy, etc. For instance, in the case of boring the cured prepreg molding 1' composed of carbon fibers and an epoxy resin and having a thickness of about 1.5 mm, the rotation speed of the burnishing drill 8 is preferably 2,000-3,000 rpm. If necessary, a cutting fluid may be used.

The tip blades 81, 81 of the burnishing drill 8 form holes with rough surfaces in the cured prepreg molding 1', and the circumferential blades 83, 83 of the burnishing drill 8 ream the holes with rough surfaces. Accordingly, one working step with the burnishing drill 8 is enough to form holes 15 having high dimensional accuracy and roundness and low surface roughness at a low cost.

(f) Removal from Die

Figure 13:
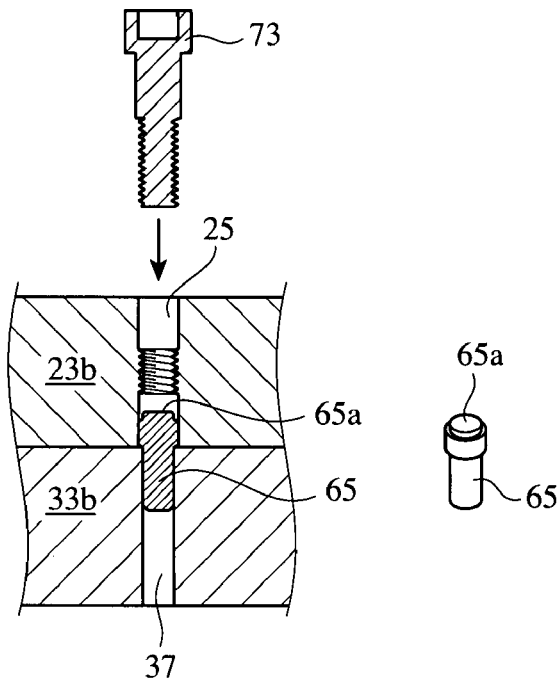
FIG. 13 is a partial cross-sectional view showing a bolt screwed into a hole of the upper die to separate the upper die from the lower die.
Figure 14:
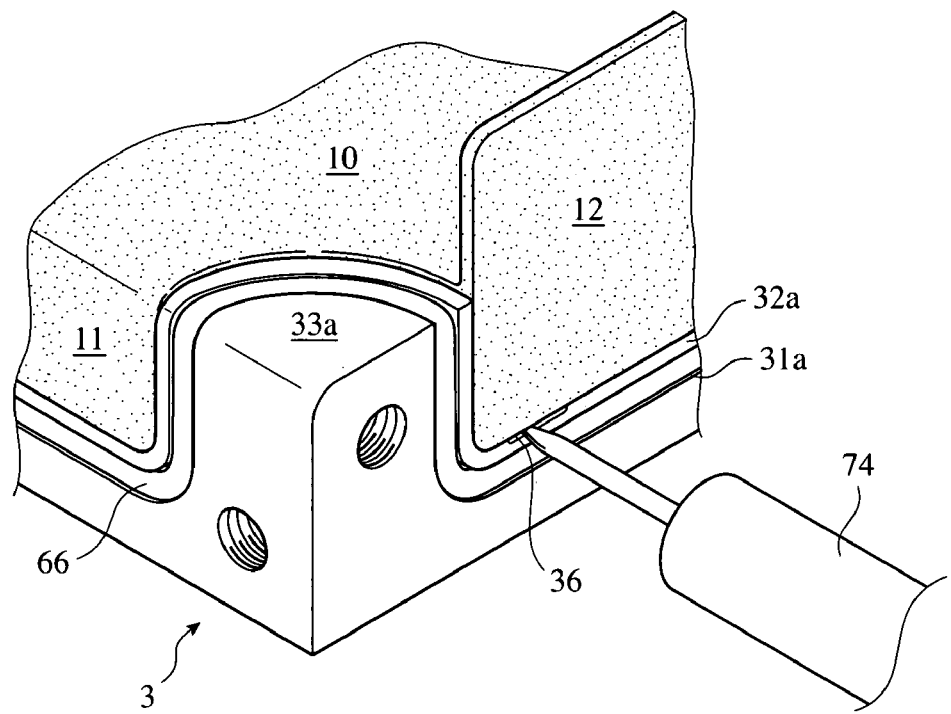
FIG. 14 is a partial perspective view showing a flat-tip tool inserted into a groove provided in a flange of the lower die to separate the fiber-reinforced composite member with connecting holes from the lower die.

The dies 2, 3 and the boring jigs 6, 7 are detached from the resultant fiber-reinforced composite member 1 with connecting holes. As shown in FIG. 13, each hole 25 of the upper die 2 has a threaded portion. A bolt 73 is screwed into the threaded hole 25 to push the head 65*a* of the pin 65 with its tip end, thereby easily separating the upper die 2 from the lower die 3. A flat-tip tool 74 such as a minus driver is inserted into the groove 26 provided on the flange 22*a* of the upper die 2 to pry the fiber-reinforced composite member 1 with connecting holes out of the upper die 2. As shown in FIG. 14, a flat-tip tool 74 is also inserted into the groove 36 provided on the flange 32*a* of the lower die 3 to pry the fiber-reinforced composite member 1 with connecting holes out of the lower die 3.

[2] Structural Member for Aircraft

Figure 15:
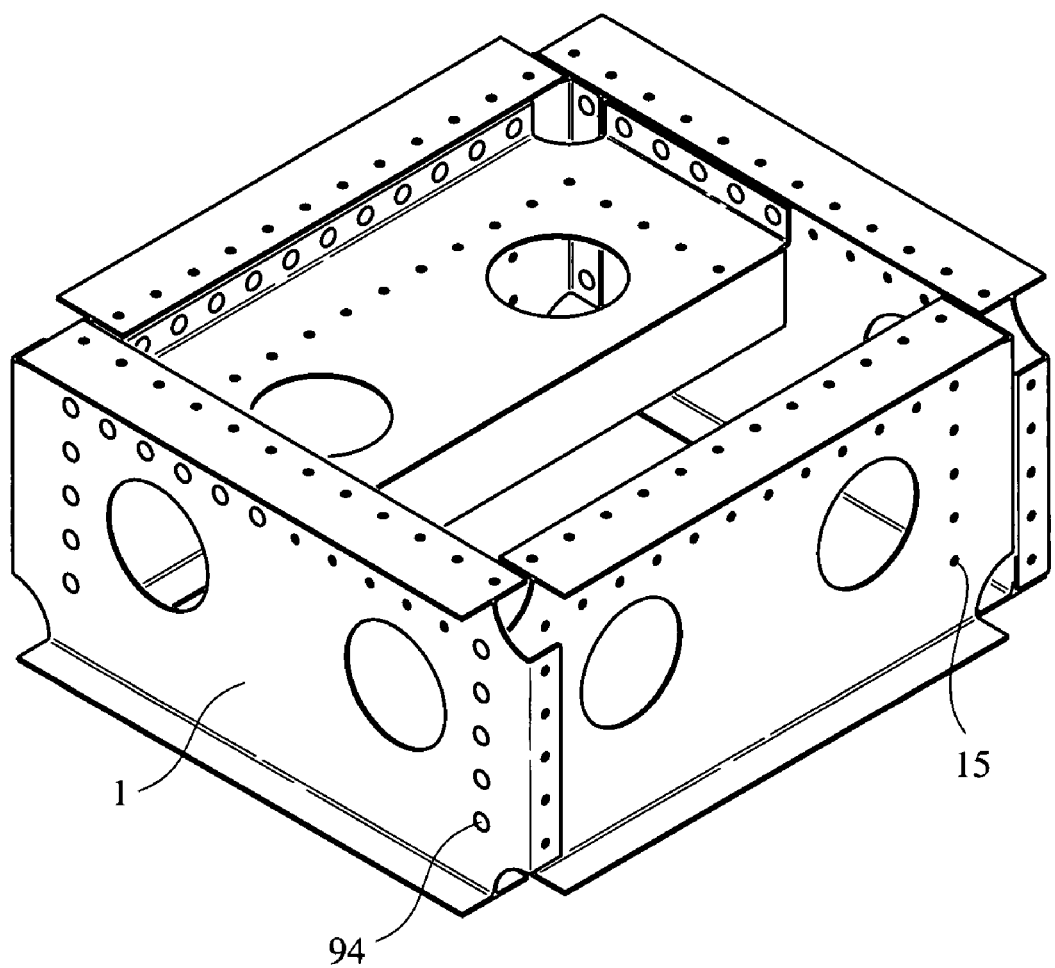
FIG. 15 is a perspective view exemplifying part of an aircraft fuselage structure assembled from the fiber-reinforced composite members with connecting holes.
Figure 16A:
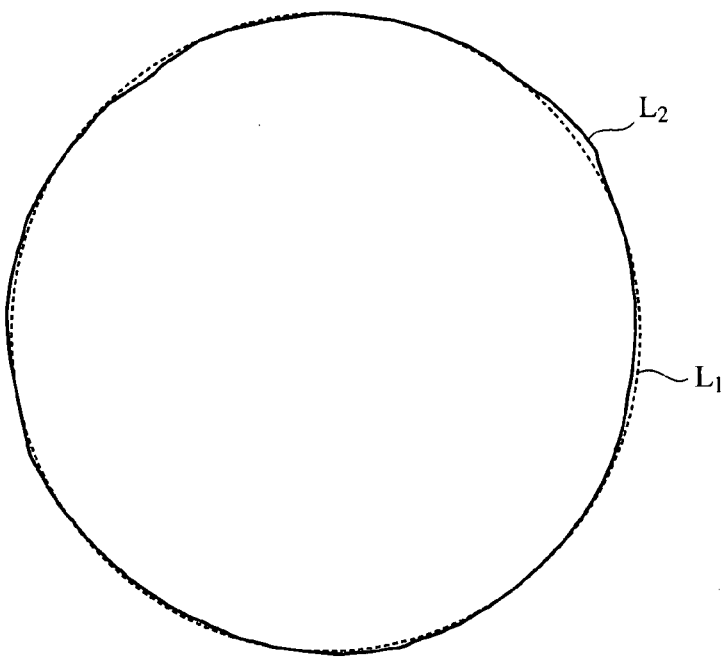
FIG. 16A is a view showing the deviation of the measured shape of an inner surface of a hole formed in Example 1 from a true circle.
Figure 16B:
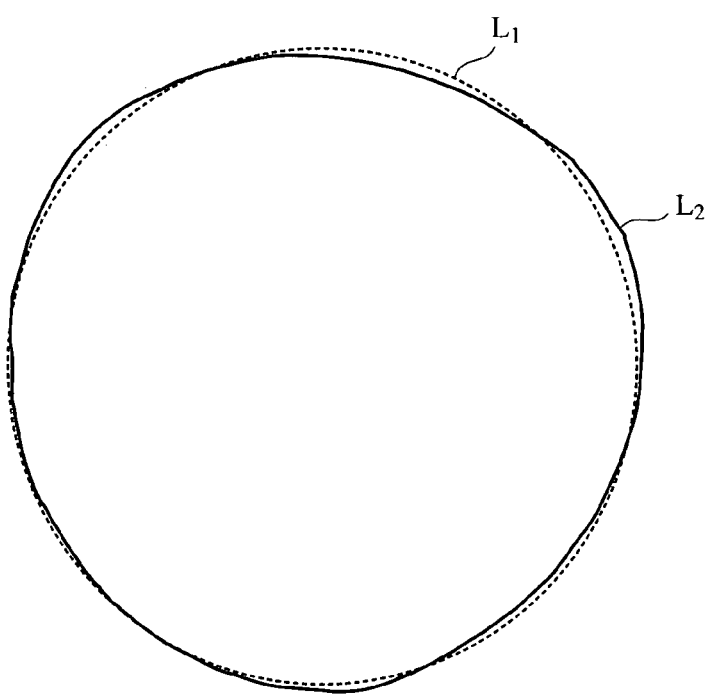
FIG. 16B is a view showing the deviation of the measured shape of an inner surface of another hole formed in Example 1 from a true circle.
Figure 16C:
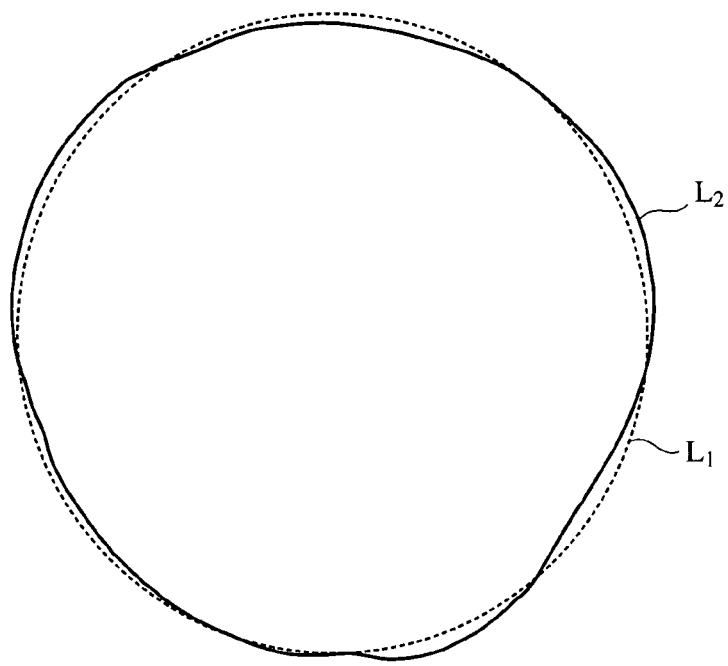
FIG. 16C is a view showing the deviation of the measured shape of an inner surface of a further hole formed in Example 1 from a true circle.
Figure 16D:
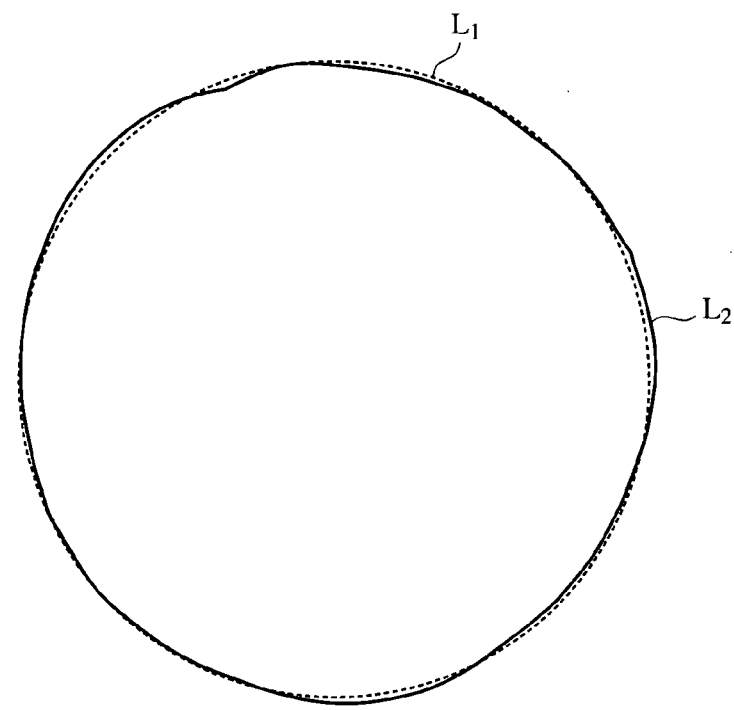
FIG. 16D is a view showing the deviation of the measured shape of an inner surface of a still further hole formed in Example 1 from a true circle.
Figure 16E:
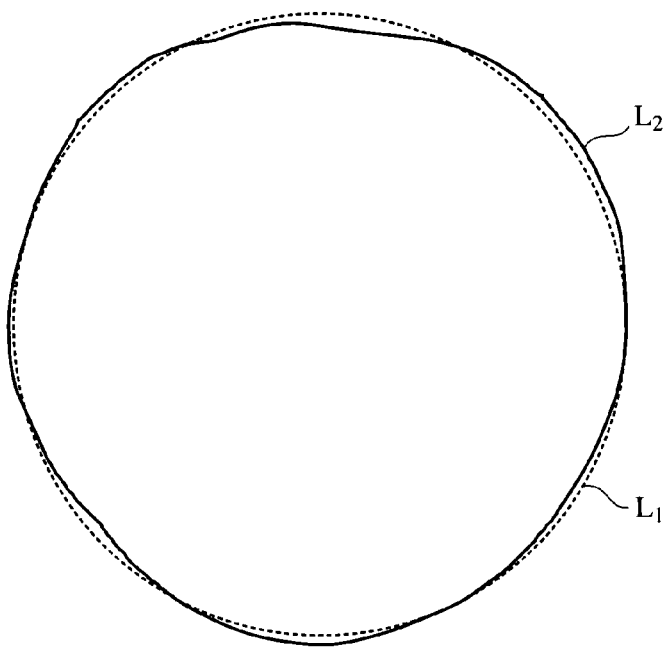
FIG. 16E is a view showing the deviation of the measured shape of an inner surface of a still further hole formed in Example 1 from a true circle.
Figure 17A:
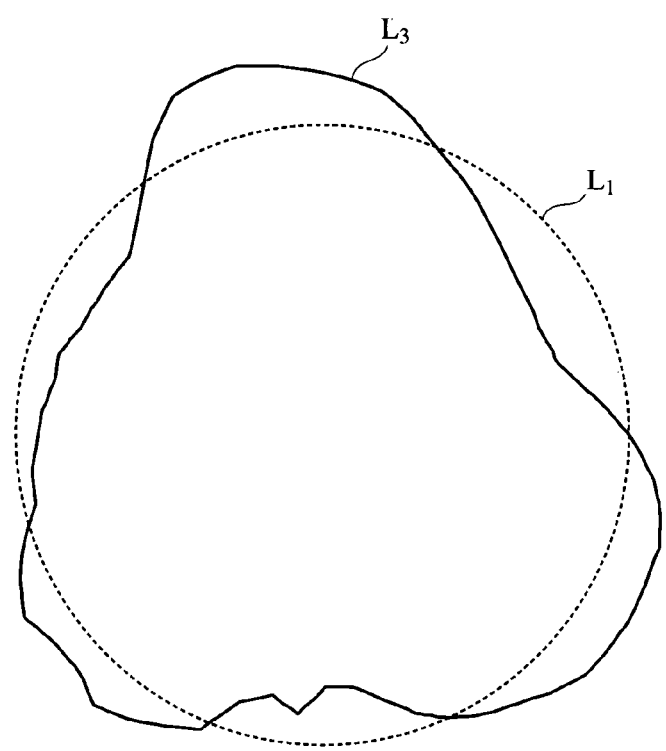
FIG. 17A is a view showing the deviation of the measured shape of an inner surface of a hole formed in Comparative Example 1 from a true circle.
Figure 17B:
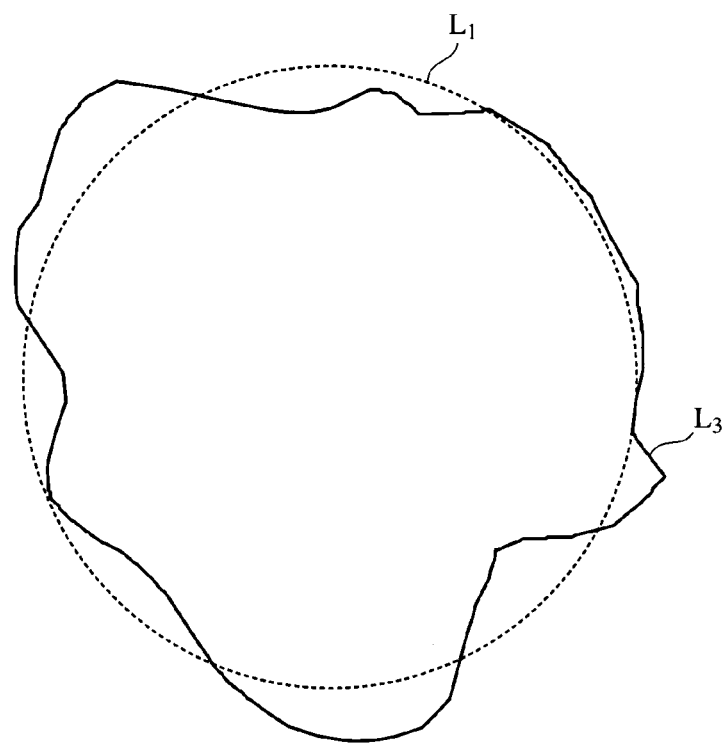
FIG. 17B is a view showing the deviation of the measured shape of an inner surface of another hole formed in Comparative Example 1 from a true circle.
Figure 17C:
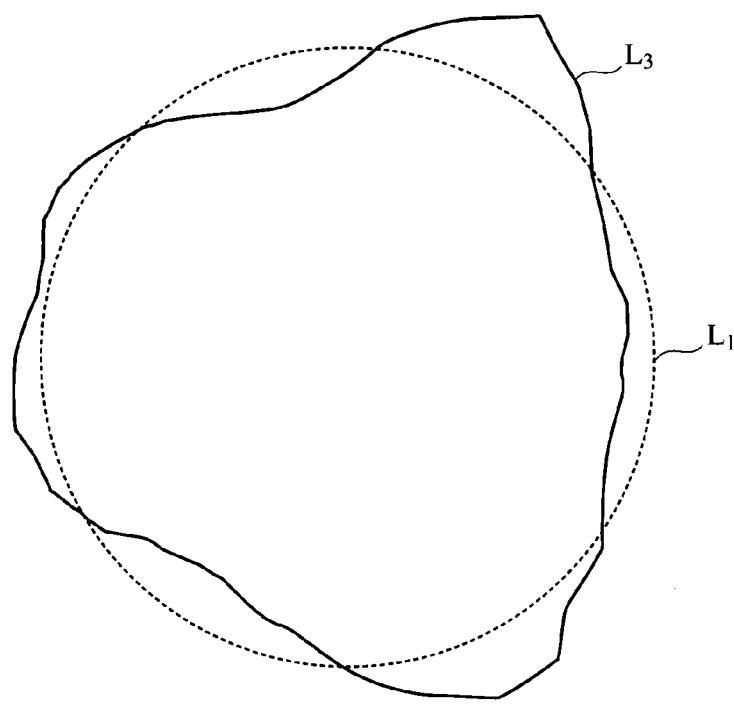
FIG. 17C is a view showing the deviation of the measured shape of an inner surface of a further hole formed in Comparative Example 1 from a true circle.
Figure 17D:
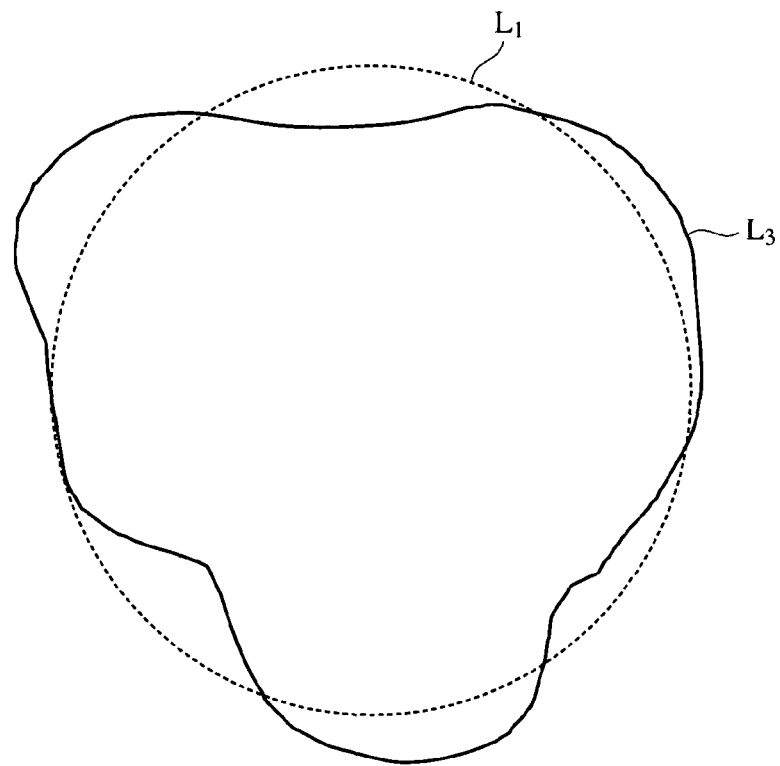
FIG. 17D is a view showing the deviation of the measured shape of an inner surface of a still further hole formed in Comparative Example 1 from a true circle.
Figure 17E:
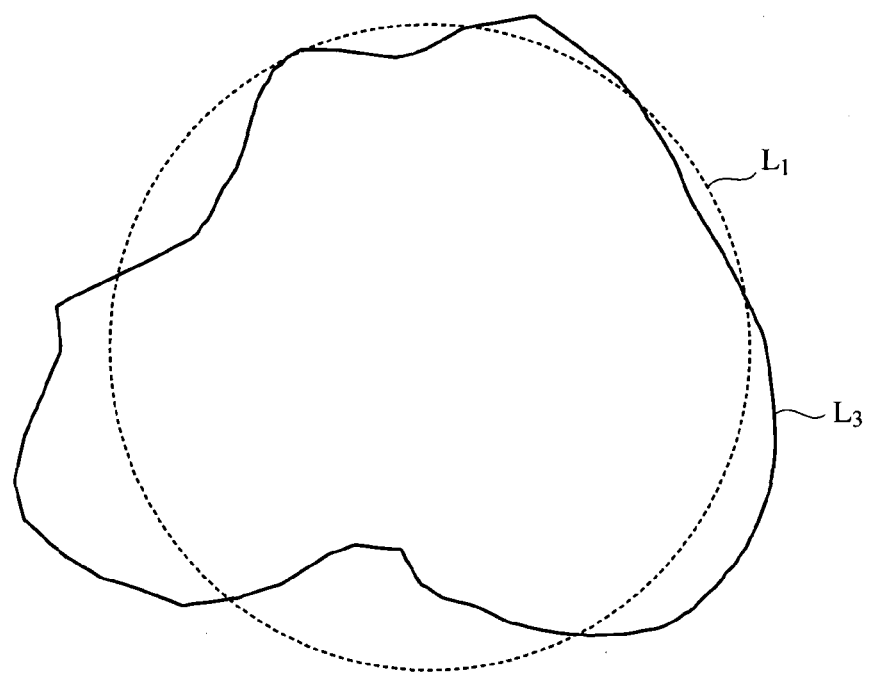
FIG. 17E is a view showing the deviation of the measured shape of an inner surface of a still further hole formed in Comparative Example 1 from a true circle.

The fiber-reinforced composite members with connecting holes thus obtained are light in weight and high in strength, suitable as members for constructing the aircraft fuselage structure. FIG. 15 shows an example of the aircraft fuselage structure constituted by the fiber-reinforced composite members with connecting holes produced by the method of the present invention. The fiber-reinforced composite members 1 with connecting holes are connected by rivets 94. The structure shown in FIG. 15 can be used as a floor structure in the aircraft fuselage. Although the fiber-reinforced composite members 1 with connecting holes are connected to each other in this example, they may be connected to other members such as aluminum alloy members. Although the fiber-reinforced composite members 1 with connecting holes having the same shape are connected in the example shown in FIG. 15, the fiber-reinforced composite members 1 with connecting holes having different shapes may be combined.

The present invention will be described in more detail by Examples below without intention of restricting the scope of the present invention.

EXAMPLE 1

A cured prepreg molding 1' composed of carbon fibers and an epoxy resin was produced by the procedures shown in FIGS. 5A to 8. A burnishing drill 8 having a diameter D of 4.1 mm shown in FIG. 9, which was rotating at 2,000 rpm, was inserted into a 1.56-mm-thick, flat plate portion 10' of the cured prepreg molding 1' to form five holes 15 by the procedures shown in FIGS. 10-12. The coordinates of pluralities of points on a line on the inner surface of each hole 15 crossing a flat plane perpendicular to the hole 15 were measured by a three-coordinate measuring machine. FIGS. 16A-16E show an annular line (measured line) $L_2$ connecting the measured coordinates of each hole 15, and a true circle $L_1$ having the same area as that of a region encircled by the measured line $L_2$. In each figure, the depicted deviation of the measured line $L_2$ from the true circle $L_1$ is enlarged with the same magnification for clarity. Any measured line $L_2$ had sufficiently small deviation from the true circle $L_1$. It is thus clear that the use of a burnishing drill 8 can form a hole 15 having high dimensional accuracy and roundness even by one working step.

COMPARATIVE EXAMPLE 1

Five holes 15 were formed in a flat plate portion 10' of the cured prepreg molding 1' in the same manner as in Example 1 except for using a twist drill having a diameter of 4.1 mm. The three-dimensional coordinates of the inner surface of each hole 15 were measured in the same manner as in Example 1. FIGS. 17A-17E show an annular line (measured line) $L_3$ connecting the measured coordinates of each hole 15, and a true circle $L_1$ having the same area as that of a region encircled by the measured line $L_3$. In each figure, the depicted deviation of the measured line $L_3$ from the true circle $L_1$ is enlarged with the same magnification as in Example 1. As is clear from FIGS. 17A-17E, the deviations from of the measured lines $L_3$ from the true circles $L_1$ were much larger than those in Example 1, indicating that the holes 15 had low dimensional accuracy and roundness. To achieve the same roundness as in Example 1, an additional working such as reaming, etc. is needed, inevitably resulting in an increased working cost.

Although the present invention has been explained in detail referring to the drawings and Example, the present invention is not restricted thereto, but various modifications may be made unless they deviate from the scope of the present invention.

EFFECT OF THE INVENTION

The use of a burnishing drill having drilling blades and reaming blades can form connecting holes having high dimensional accuracy and roundness and low sufficient roughness in the fiber-reinforced composite member by one working step. Connection can be obtained at high accuracy between the fiber-reinforced composite members with connecting holes, or between the fiber-reinforced composite members and metal parts, resulting in structures having high connecting strength and durability. The fiber-reinforced composite members with connecting holes are suitable for aircraft fuselage structures.

What is claimed is:

1. A method for producing a fiber-reinforced composite member with connecting holes, comprising:

producing a cured prepreg molding of reinforcing fibers impregnated with a matrix resin using a molding die comprising upper and lower dies, at least one of which has a cavity; and boring said cured prepreg molding to form said connecting holes, using a burnishing drill comprising two or more tapered tip blades, two or more circumferential blades extending continuously from said tip blades to a shank, and chip-discharging grooves extending from said tip blades to said shank, wherein said cured prepreg molding is produced using a molding die comprising upper and lower dies, at least one of which has a cavity; wherein the horizontal portions of said upper and lower dies have aligned holes; and wherein said burnishing drill is inserted into said aligned holes to form connecting holes in said cured prepreg molding held in said cavity.

2. The method for producing a fiber-reinforced composite member with connecting holes according to claim 1, wherein said cured prepreg molding is produced by placing said prepregs in said cavity, cutting off excess margins of said prepregs along the edges of said cavity, and curing said matrix resin.

3. The method for producing a fiber-reinforced composite member with connecting holes according to claim 2, wherein said cured prepreg molding member has a rectangular, flat panel portion and at least one flange extending from its edge, and wherein the cavity of said molding die has a horizontal portion for supporting said rectangular, flat panel portion and at least one vertical portion for supporting said flange.

4. The method for producing a fiber-reinforced composite member with connecting holes according to claim 1, wherein a cylindrical guide plug is fixed in each hole provided in the horizontal portion of said upper die cavity, and wherein said burnishing drill is inserted into said guide plug to bore said cured prepreg molding.

5. The method for producing a fiber-reinforced composite member with connecting holes according to claim 1, wherein the vertical portions of said upper die and/or lower die have holes, and wherein said burnishing drill is inserted into each hole provided in the vertical portions of said upper die and/or said lower die, to bore a flange of the cured prepreg molding in said cavity.

6. The method for producing a fiber-reinforced composite member with connecting holes according to claim 5, wherein a cylindrical guide plug is fixed in each hole provided in a boring jig abutting the flange of said cured prepreg molding, and wherein said burnishing drill is inserted into said guide plug to bore said cured prepreg molding.

* * * * *